United States Patent

(12) United States Patent
Ichikawa et al.

(10) Patent No.: US 8,446,512 B2
(45) Date of Patent: May 21, 2013

(54) IMAGE FORMING OPTICAL SYSTEM AND ELECTRONIC IMAGE PICKUP APPARATUS EQUIPPED WITH SAME

(75) Inventors: Keisuke Ichikawa, Tama (JP); Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/199,726

(22) Filed: Sep. 6, 2011

(65) Prior Publication Data

US 2012/0057068 A1    Mar. 8, 2012

(30) Foreign Application Priority Data

Sep. 7, 2010   (JP) ................... 2010-200140

(51) Int. Cl.
*H04N 5/225*   (2006.01)
*G02B 15/14*   (2006.01)
*G02B 13/02*   (2006.01)
*G02B 7/28*    (2006.01)

(52) U.S. Cl.
USPC ........... 348/335; 348/340; 348/345; 348/360; 359/691; 359/748; 396/111

(58) Field of Classification Search
USPC ................. 348/335, 340, 345, 360; 359/691, 359/748; 396/55, 111
See application file for complete search history.

(56) References Cited

U.S. PATENT DOCUMENTS

| 7,864,454 B1 * | 1/2011 | Tang et al. ............ 359/764 |
| 2007/0070234 A1 * | 3/2007 | Sun .................. 348/335 |
| 2008/0212203 A1 * | 9/2008 | Taguchi et al. ......... 359/691 |
| 2009/0122423 A1 * | 5/2009 | Park et al. ............ 359/764 |
| 2010/0188555 A1 * | 7/2010 | Hirao et al. ........... 348/340 |

FOREIGN PATENT DOCUMENTS

| JP | 2002-048975 | 2/2002 |
| JP | 2002-365545 | 12/2002 |
| JP | 2003-131130 | 5/2003 |
| JP | 2003-140043 | 5/2003 |
| JP | 2008-233611 | 10/2008 |

* cited by examiner

*Primary Examiner* — Chieh M Fan
*Assistant Examiner* — Quang Le
(74) *Attorney, Agent, or Firm* — Kenyon & Kenyon LLP

(57) ABSTRACT

An optical system includes, in order from its object side a negative first lens unit, a positive second lens unit, a negative third lens unit, and a positive fourth lens unit. The air gaps between the lens units are variable during zooming. The first lens unit includes one positive lens, the second lens unit includes one negative lens, the third lens unit consists of one or two lens components, and the fourth lens unit consists of one lens component, where the term "lens component" refers to a single lens or a cemented lens. The system satisfies the condition "0<M3/M2<0.55", where M2 and M3 are the amounts of movement of the second lens unit and the third lens unit respectively during zooming from the wide angle end to the telephoto end in the state in which the zoom lens is focused on an object point at infinity.

5 Claims, 19 Drawing Sheets

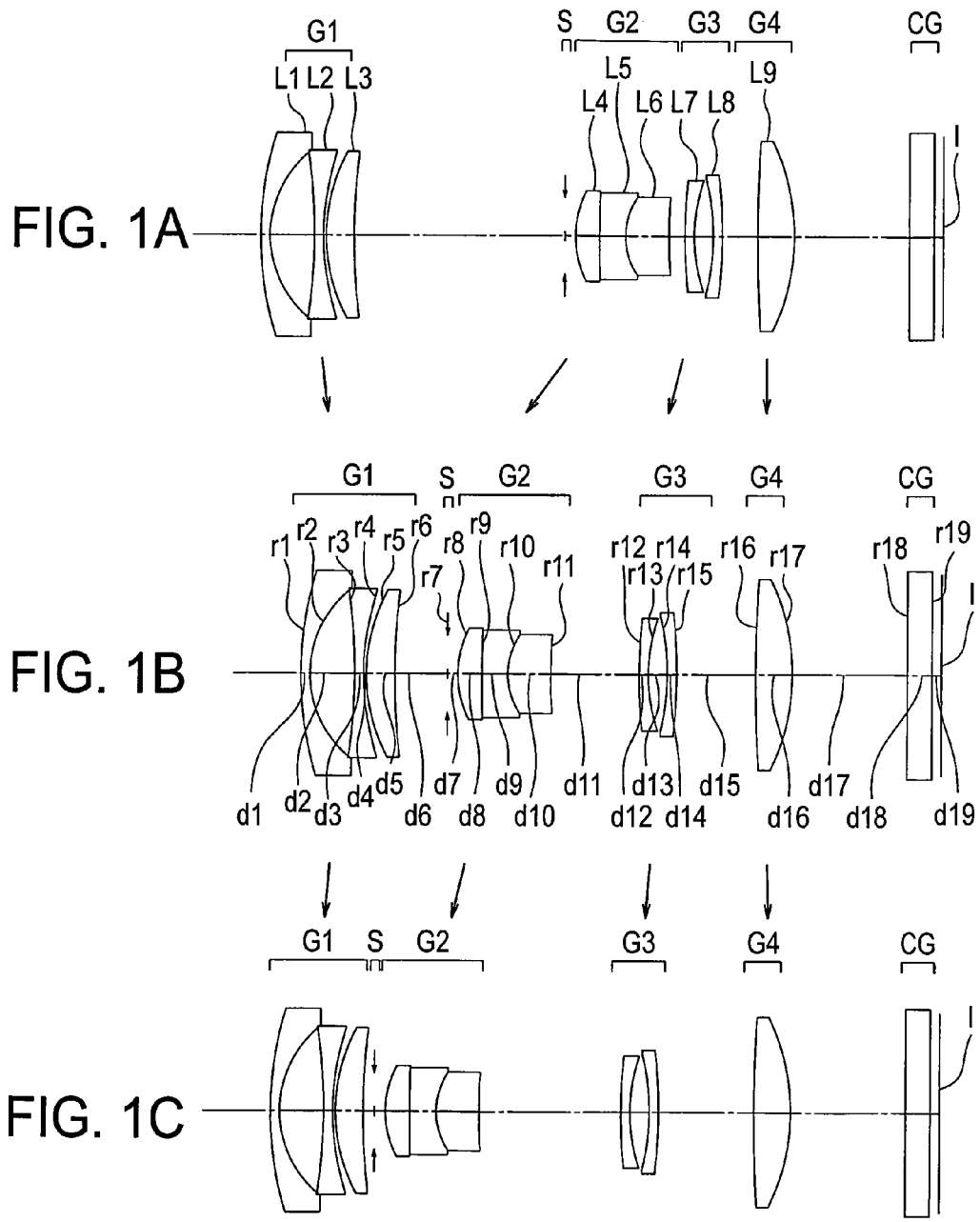

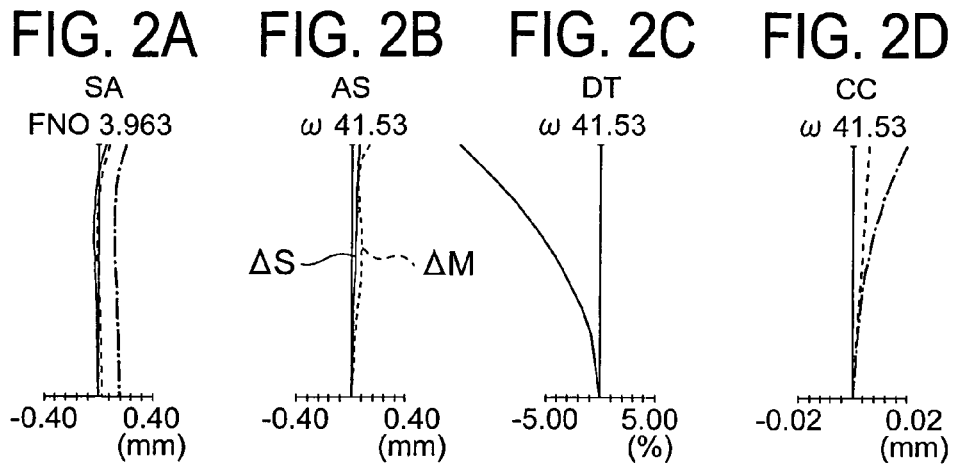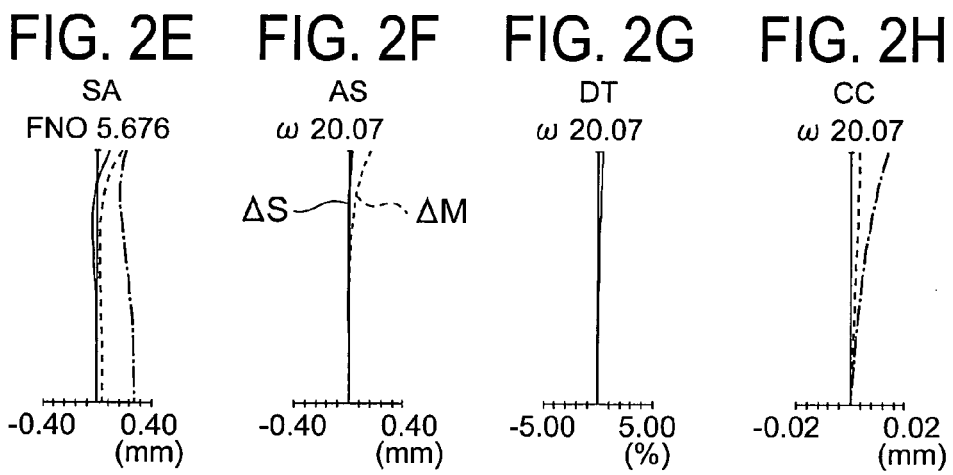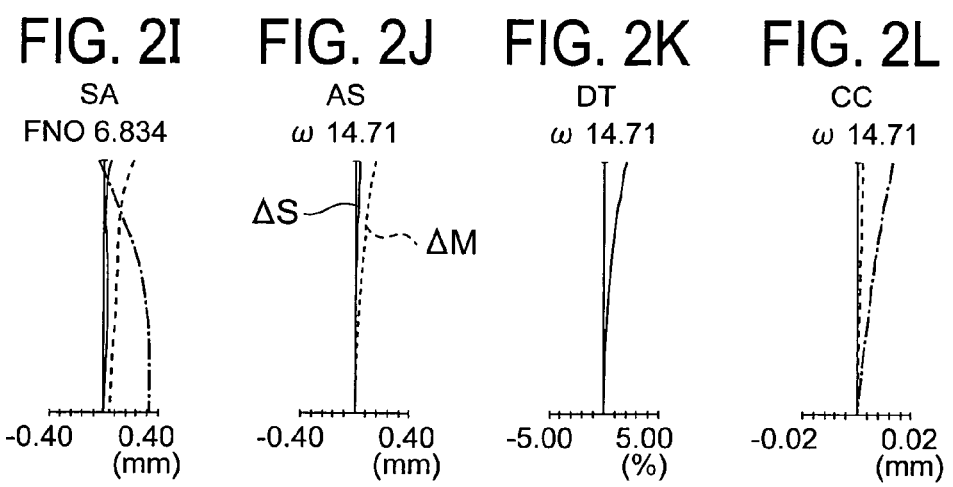

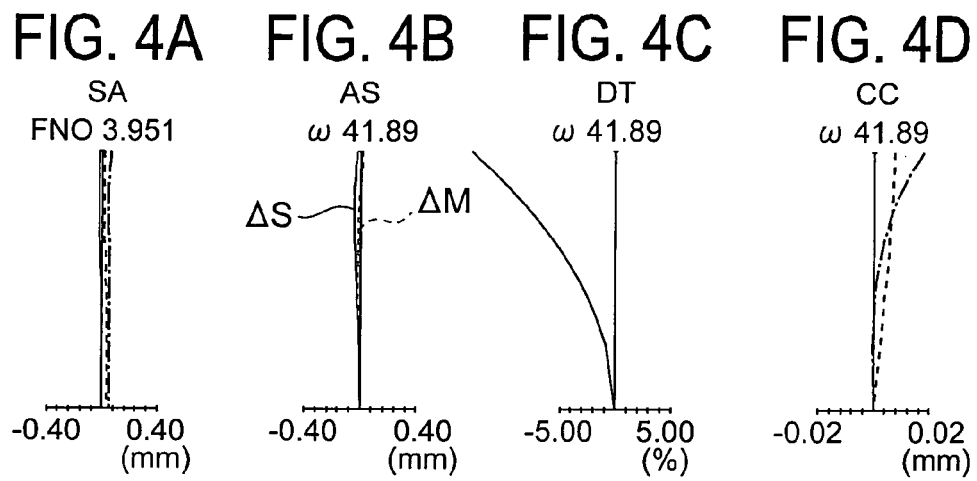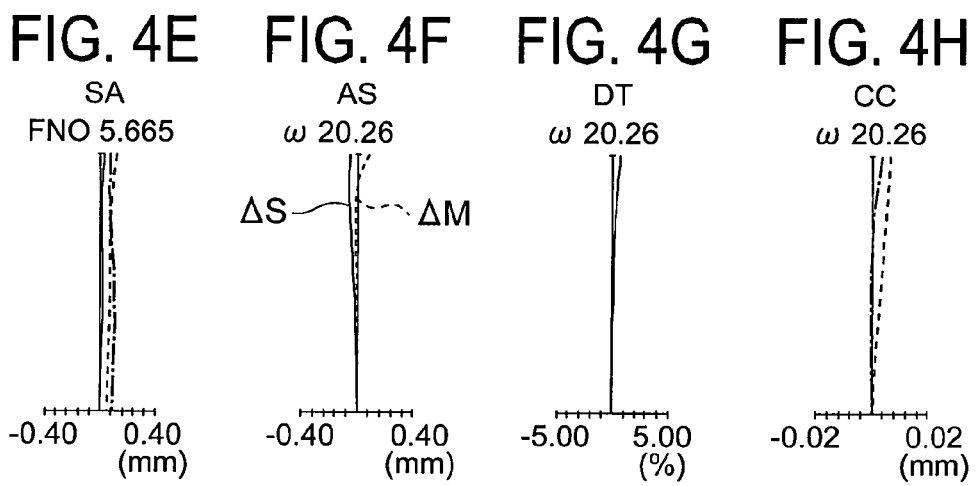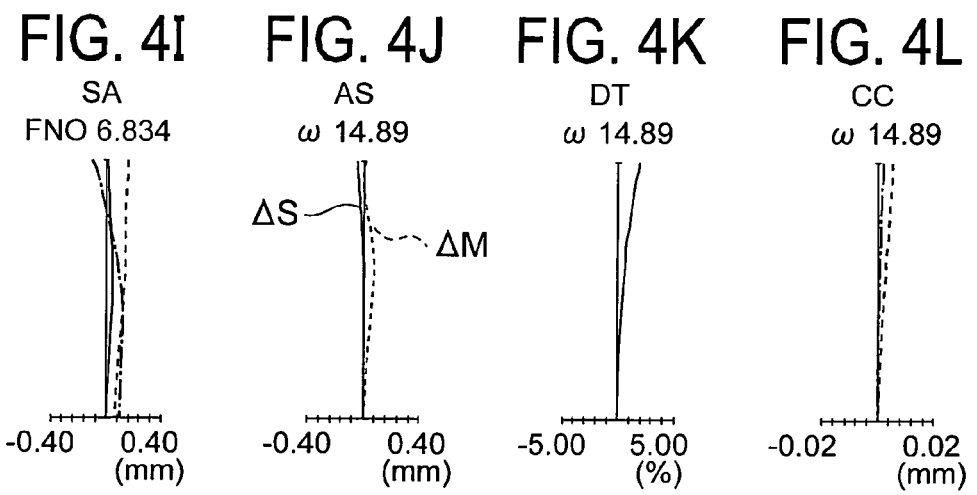

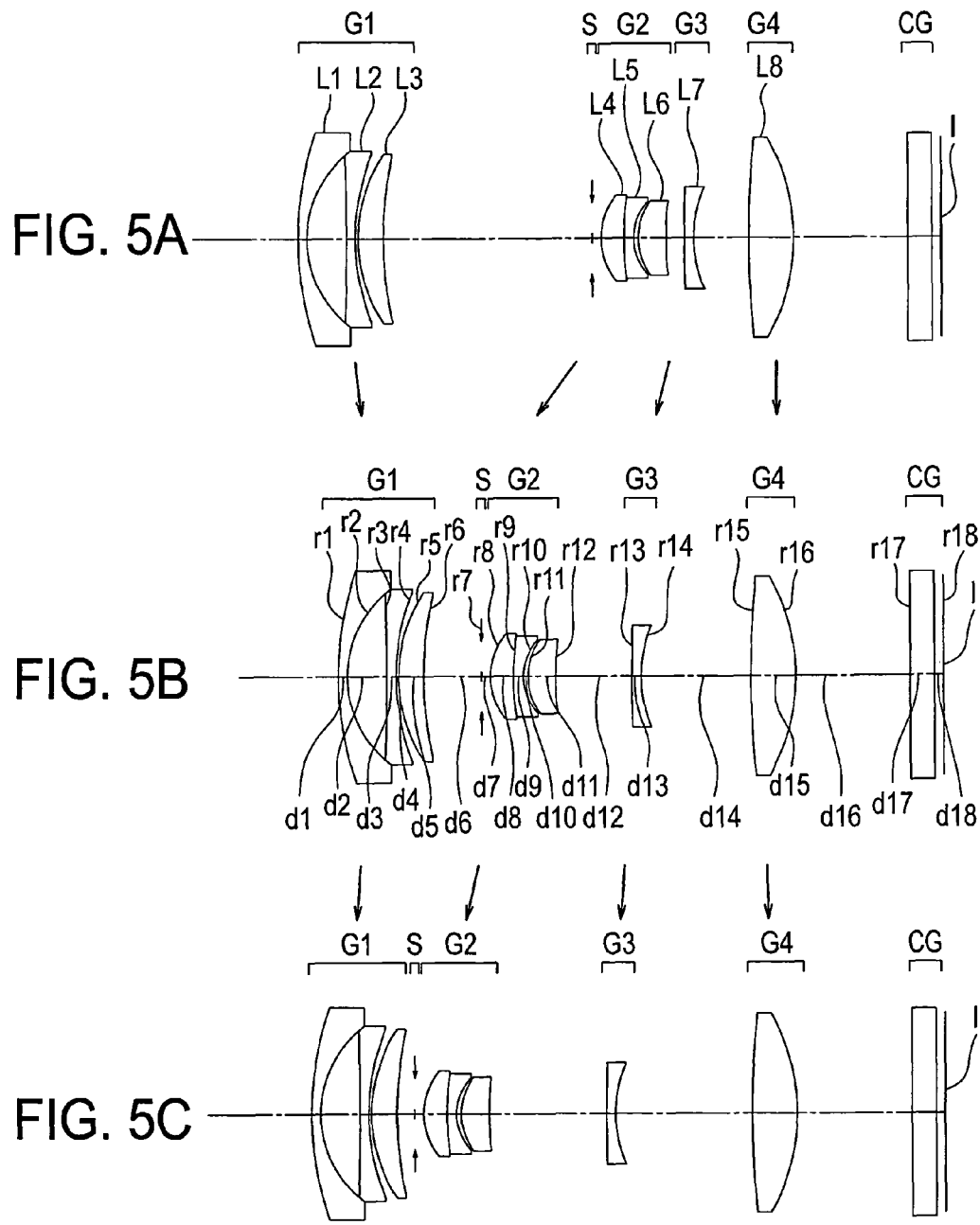

SA
FNO 3.988
-0.40  0.40
(mm)

AS
ω 42.44
-0.40  0.40
(mm)

DT
ω 42.44
-5.00  5.00
(%)

CC
ω 42.44
-0.02  0.02
(mm)

SA
FNO 5.683
-0.40  0.40
(mm)

AS
ω 20.61
-0.40  0.40
(mm)

DT
ω 20.61
-5.00  5.00
(%)

CC
ω 20.61
-0.02  0.02
(mm)

SA
FNO 6.835
-0.40  0.40
(mm)

AS
ω 15.17
-0.40  0.40
(mm)

DT
ω 15.17
-5.00  5.00
(%)

CC
ω 15.17
-0.02  0.02
(mm)

435.84 —·—·—
656.27 - - - - - -
587.56 ———

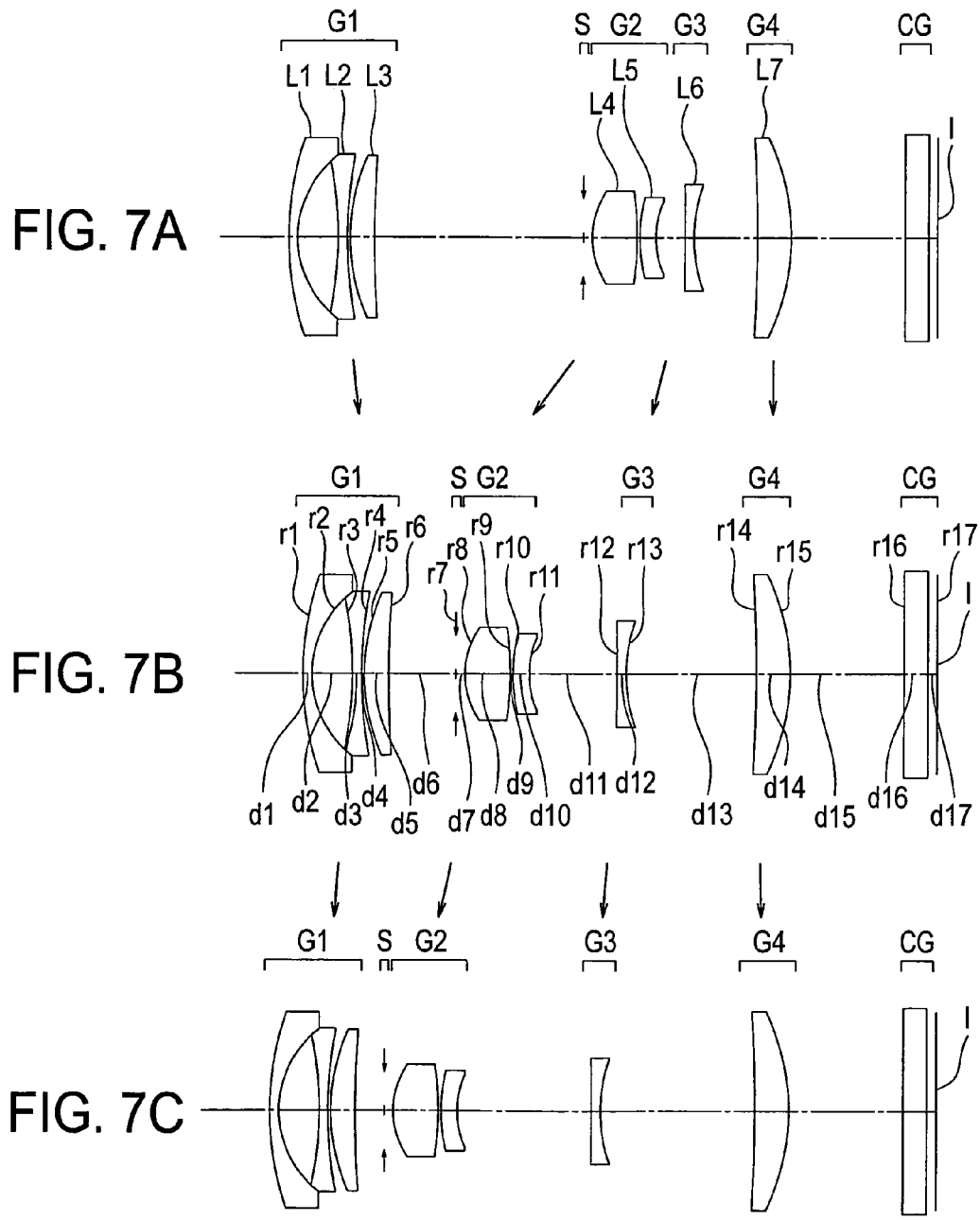

FIG. 8A
SA
FNO 3.831

FIG. 8E
SA
FNO 5.640

FIG. 8I
SA
FNO 6.834

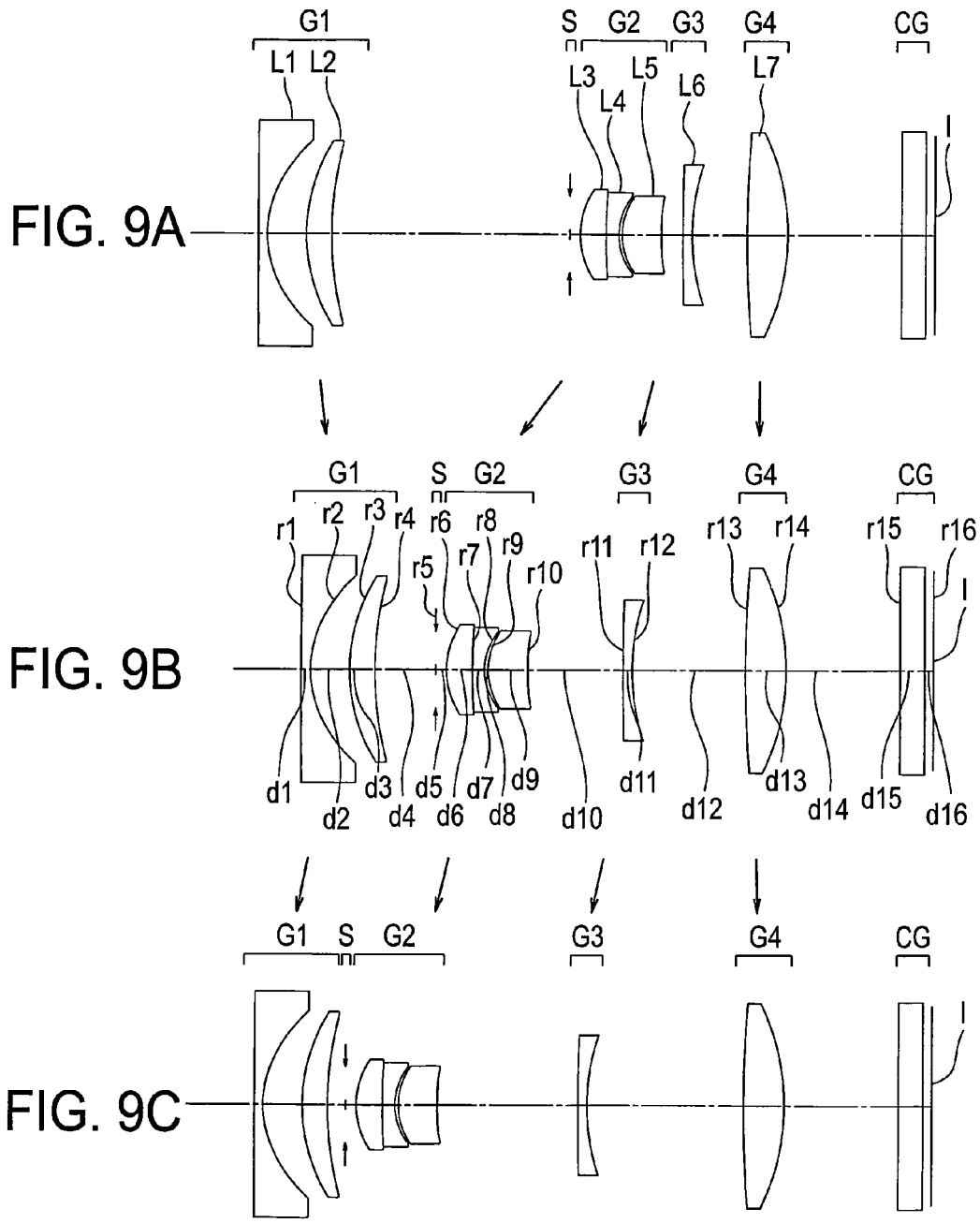

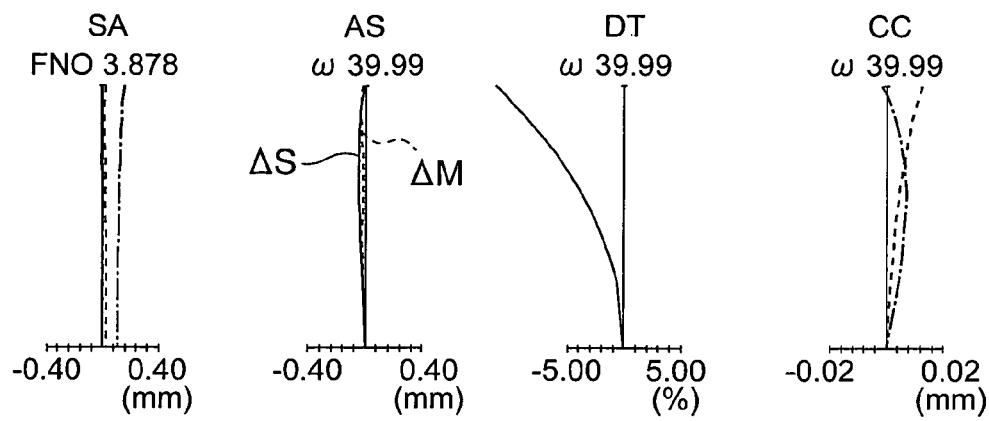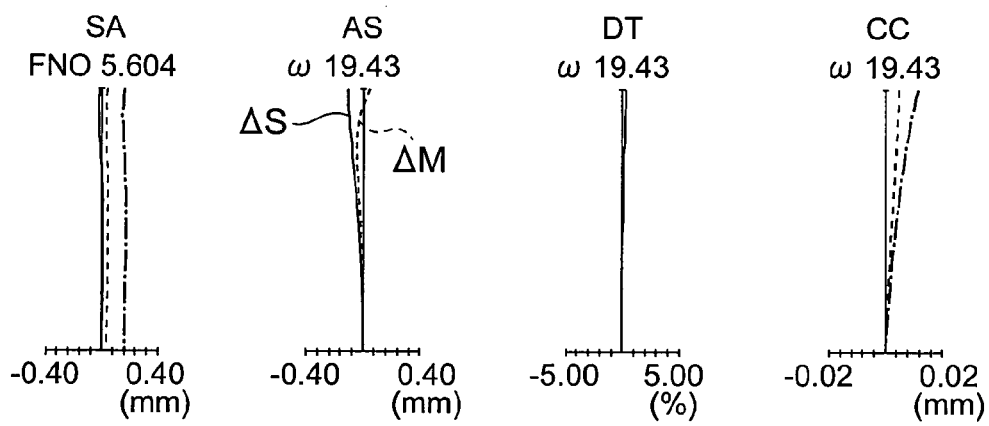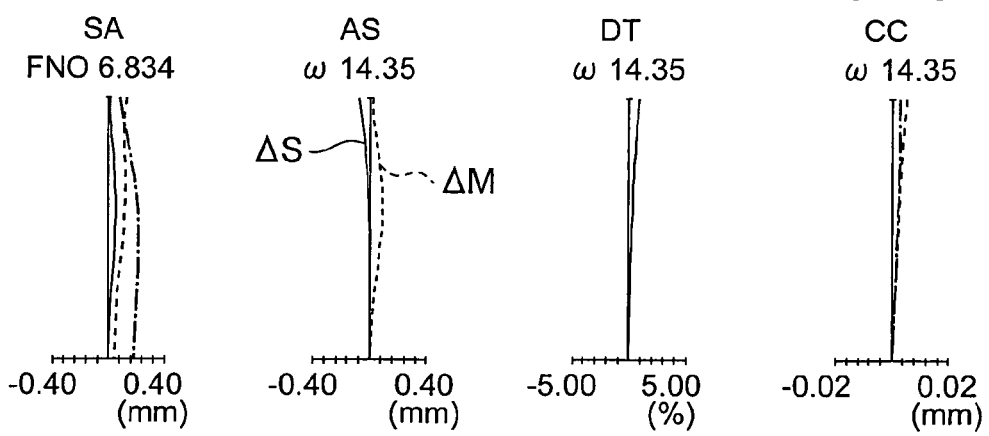

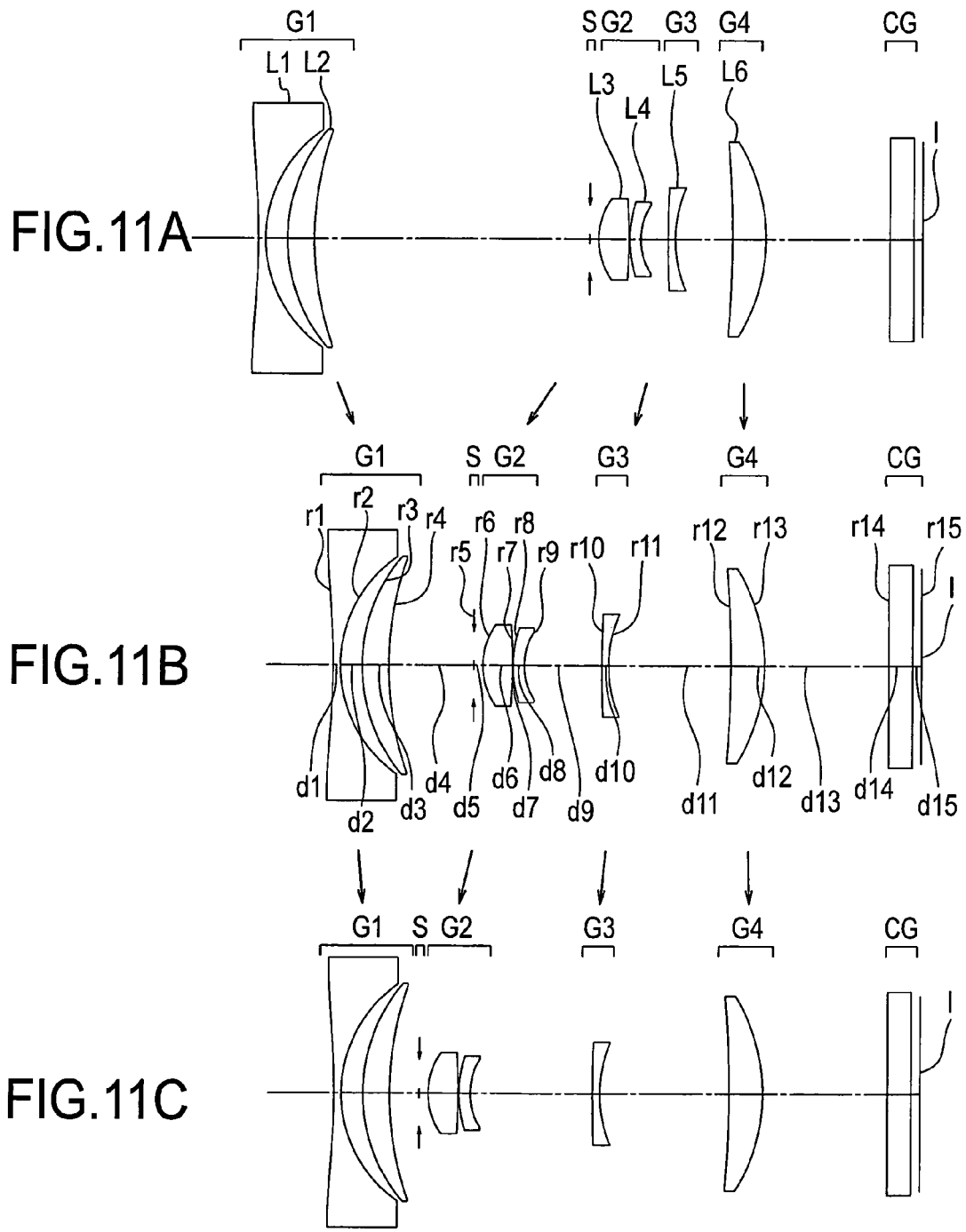

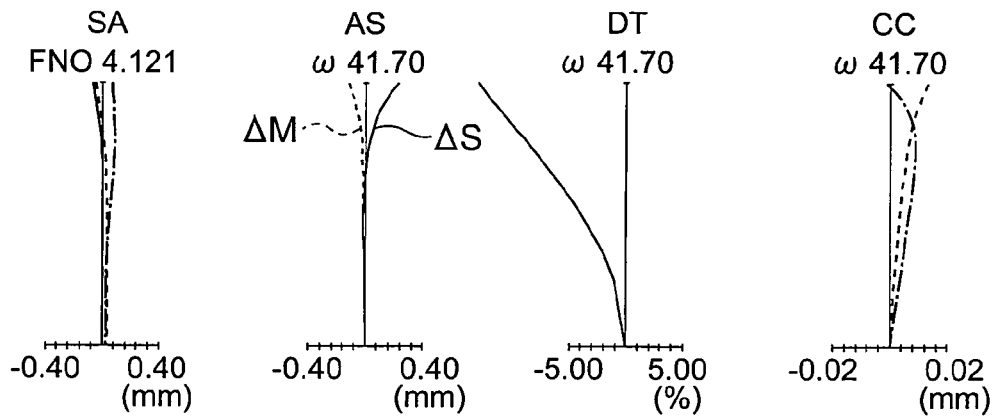
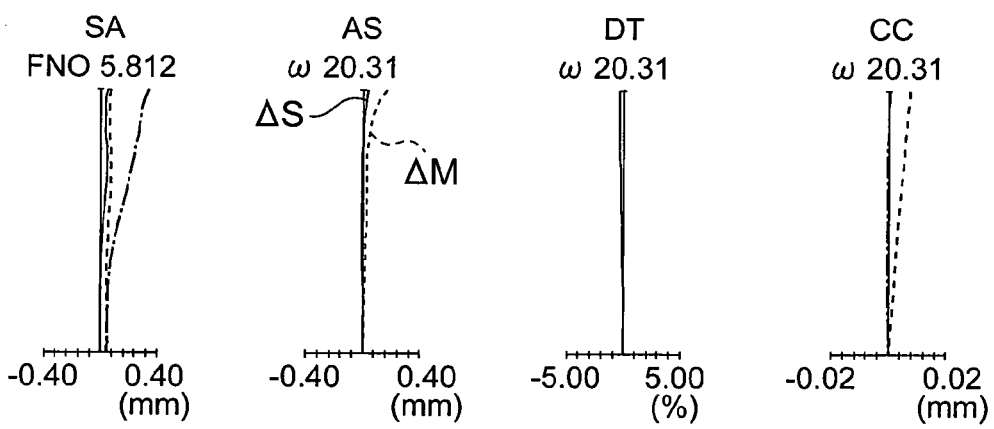
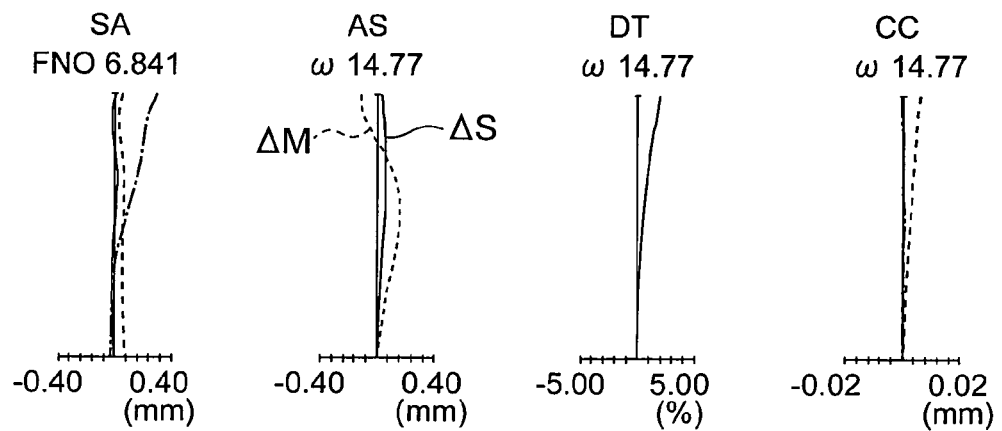

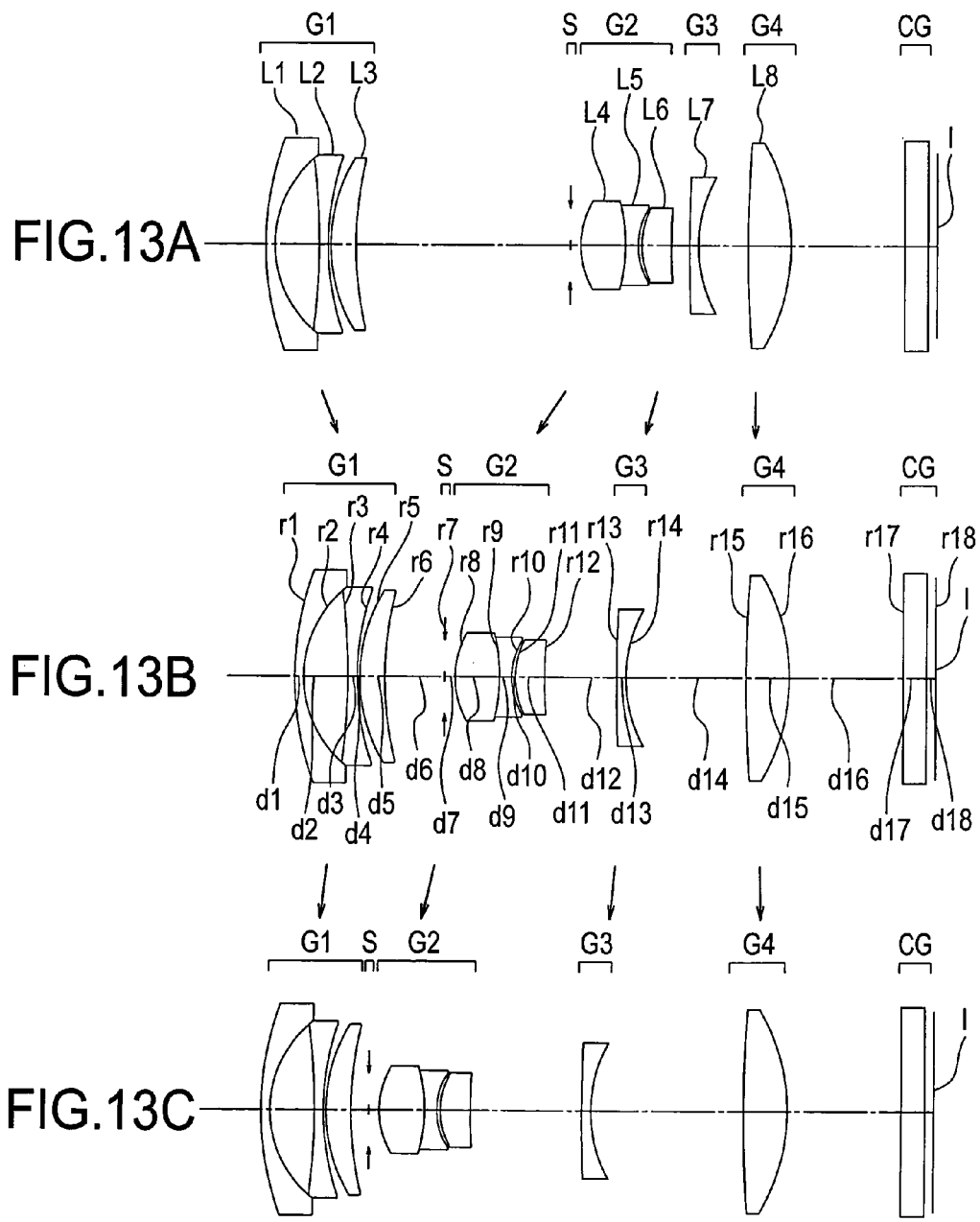

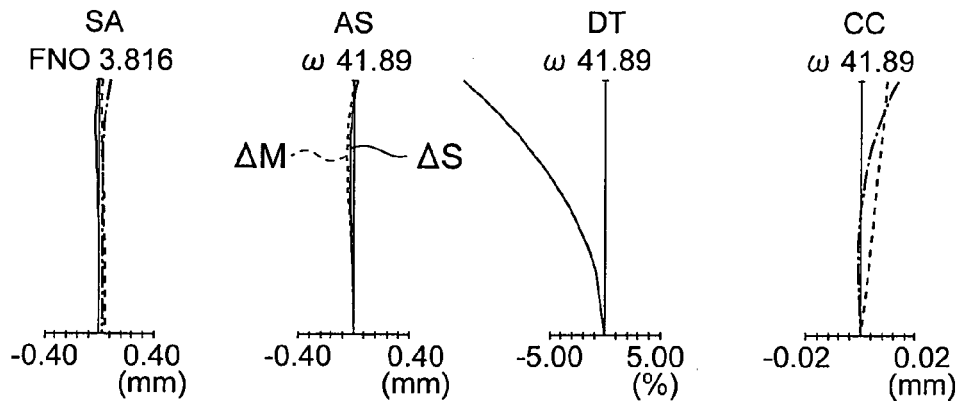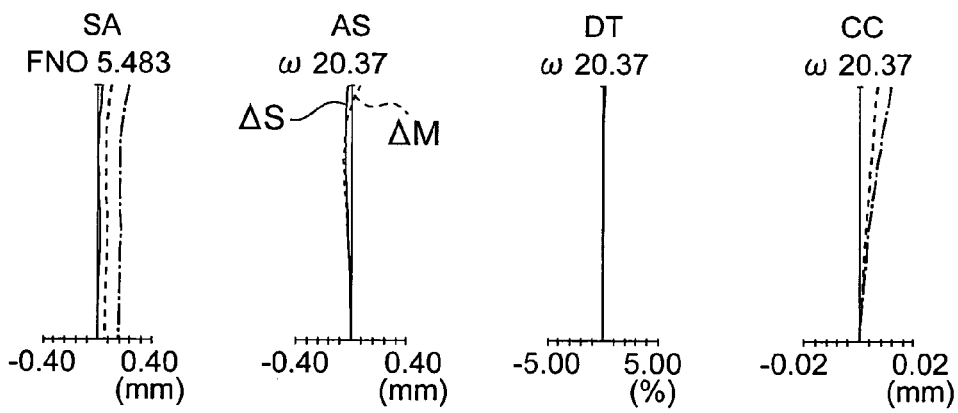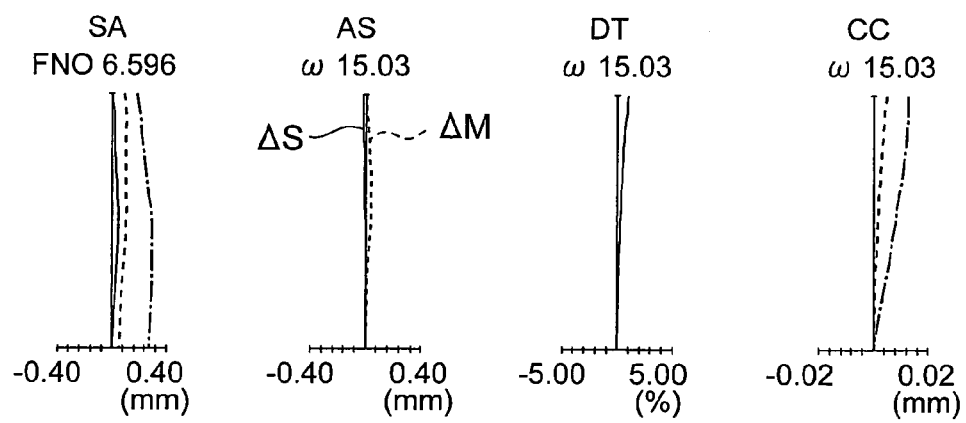

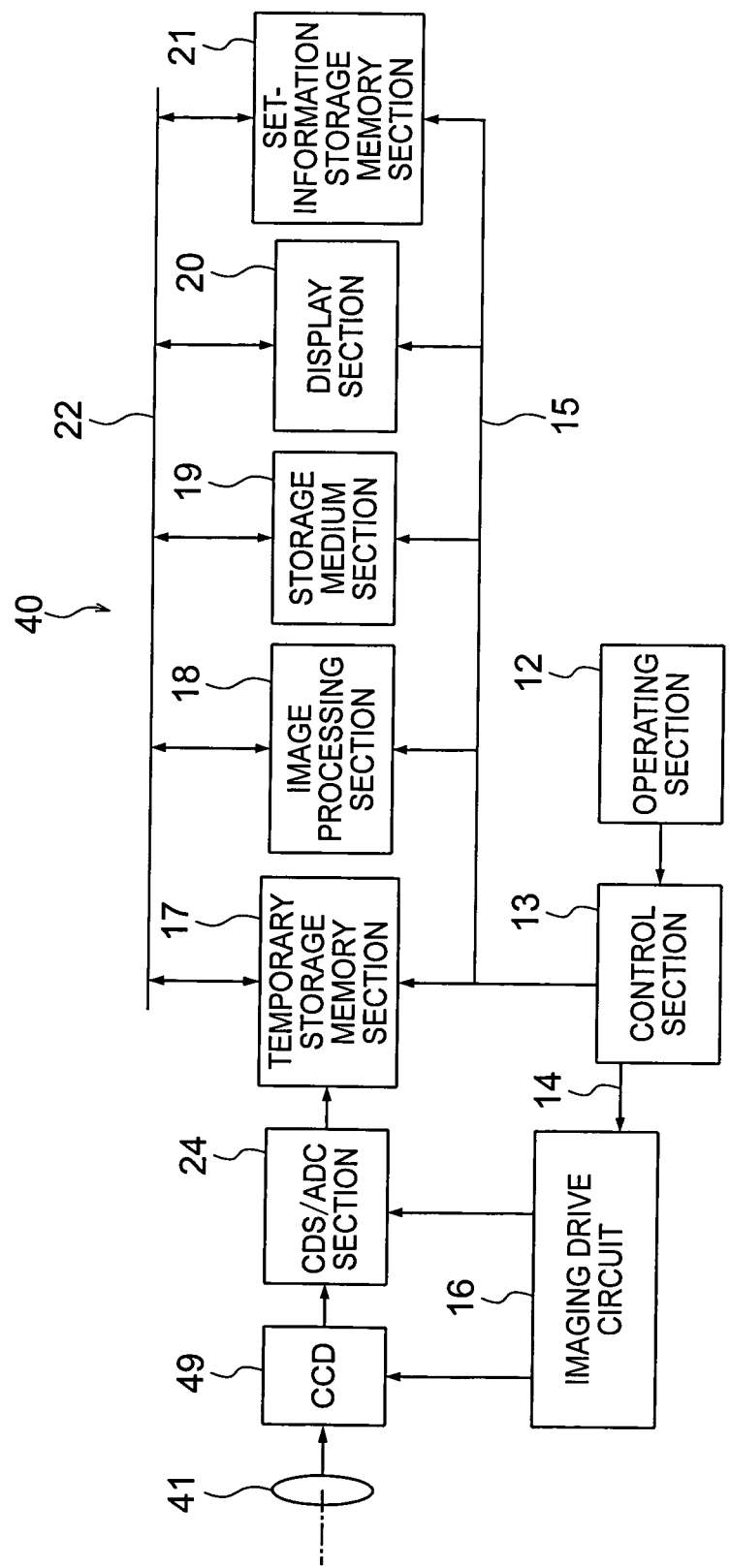

IMAGE FORMING OPTICAL SYSTEM AND ELECTRONIC IMAGE PICKUP APPARATUS EQUIPPED WITH SAME

CROSS-REFERENCE TO RELATED APPLICATION

The present application is based upon and claims the benefit of priority from the prior Japanese Patent Application No. 2010-200140 filed on Sep. 7, 2010; the entire contents of which are incorporated herein by reference.

BACKGROUND OF THE INVENTION

1. Field of the Invention

The present invention relates to an image forming optical system, in particular to an optical system that can suitably applied to interchangeable lenses for interchangeable-lens cameras. The present invention also relates to an electronic image pickup apparatus equipped with such an image forming optical system.

2. Description of the Related Art

With increases in the number of pixels of image pickup elements and development of digital image processing techniques in recent years, digital cameras have replaced 35 mm film cameras. Moreover, with increases in the number of pixels of small size liquid crystal display panels used as viewfinders, the shift from single lens reflex cameras to new concept cameras without a quick-return mirror have been progressing.

Cameras without a quick-return mirror allow the design of small size, high performance image forming optical systems with a relatively short back focus. In addition, cameras without a quick-return mirror eliminate the dependency of the size of the viewfinder image on the imaging size of the lens or the diameter of the image circle. Therefore, a large viewfinder image can be obtained even if the image pickup format size is small. In addition, it is possible to design image forming optical systems that are small in size while having high performance.

On the other hand, small size cameras or compact cameras having a fixed lens, which have a short back focus and small image pickup format size, have been widespread. Zoom optical systems that are suitable for use in this type of cameras are disclosed in, for example, Japanese Patent Application Laid-Open Nos. 2002-48975, 2002-365545, and 2003-140043 as embodiments.

The optical systems disclosed in these documents have three lens units including, in order from the object side, a negative lens unit, a positive lens unit, and a positive lens unit. This zoom lens configuration is achieved by adding a positive third lens unit on the image side of the most basic two unit zoom lens configuration (composed of two lens units including a negative lens unit and a positive lens unit). The addition of the positive third lens unit enables a reduction in the overall length of the zoom lens at the wide angle end (at which the overall length tends to be large) and facilitates an increase in the zoom ratio.

A further increase in the number of lens units is not so effective, though zoom optical systems for what is called compact cameras having four lens units including in order from the object side a negative lens unit, a positive lens unit, a negative lens unit, and a positive lens unit have been developed, as described in Japanese Patent Application Laid-Open Nos. 2003-131130 and 2008-233611.

Eventually, the three unit configuration has become the most typical configuration.

It is necessary for optical systems for interchangeable-lens cameras to have a somewhat long back focus, because the total thickness of the lens system is more important than the overall optical length, and because there is a limitation on the allowable amount of extension of the optical system beyond the flange face of the camera on which the interchangeable lens is mounted.

On the other hand, interchangeable-lens cameras are required to produce images of higher image quality than images produced by what is called compact cameras. In view of this, interchangeable-lens cameras need to use a format having a relatively large size so as to be able to contain a sufficiently large number of pixels.

The pixel size in solid state image pickup elements in these years is smaller than the diameter of silver halide particles of photographic films. Therefore, satisfactory image qualities can be achieved even with formats smaller in size than the 135 format and the APS-C format.

SUMMARY OF THE INVENTION

An image forming optical system according to the present invention comprises, in order from its object side:
a first lens unit having a negative refracting power;
a second lens unit having a positive refracting power;
a third lens unit having a negative refracting power; and
a fourth lens unit having a positive refracting power,
wherein
the air gaps between the lens units are variable during zooming,
the first lens unit comprises one positive lens,
the second lens unit comprises one negative lens,
the third lens unit consists of one or two lens components,
the fourth lens unit consists of one lens component,
and the following conditional expression (1) is satisfied:

$$0 < M3/M2 < 0.55 \tag{1},$$

where M2 is the amount of movement of the second lens unit during zooming from the wide angle end to the telephoto end in the state in which the zoom lens is focused on an object point at infinity, M3 is the amount of movement of the third lens unit during zooming from the wide angle end to the telephoto end in the state in which the zoom lens is focused on an object point at infinity, and the term "lens component" refers to a single lens or a cemented lens.

An electronic image pickup apparatus according to another aspect of the present invention comprises:
an image forming optical system;
an electronic image pickup element; and
an image processing unit that processes image data obtained by picking up an image formed through the image forming optical system by the electronic image pickup element and outputs image data having a deformed image shape, wherein the image forming optical system satisfies the following conditional expression (A) when it is focused on an object point at infinity:

$$0.7 < y_{07}/(f_w \times \tan \omega_{07w}) < 0.97 \tag{A}$$

where $y_{07}$ is expressed by equation $y_{07} = 0.7 \times y_{10}$, $y_{10}$ being the distance from the center of an effective image pickup area (i.e. an area in which an image can be picked up) of the electronic image pickup element to a point farthest from the center within the effective image pickup area (this distance being defined as the largest image height), $\omega_{07w}$ is the angle between the optical axis and the direction toward an object point corresponding to an image point on the image pickup surface at a distance equal to $y_{07}$ from the center of the image pickup surface at the wide angle end in the state in which the zoom lens is focused on an object point at infinity, and fw is the focal length of the entire image forming optical system at the wide angle end in the state in which the zoom lens is focused on an object point at infinity.

BRIEF DESCRIPTION OF THE DRAWINGS

FIGS. 1A, 1B, and 1C are cross sectional views taken along the optical axis, showing the optical configuration of a zoom lens according to a first embodiment of the present invention in the state in which the zoom lens is focused on an object point at infinity, respectively at the wide angle end, at an intermediate focal length, and at the telephoto end;

FIGS. 2A, 2B, 2C, 2D, 2E, 2F, 2G, 2H, 2I, 2J, 2K and 2L are diagrams showing spherical aberration, astigmatism, distortion, and chromatic aberration of magnification of the zoom lens according to the first embodiment in the state in which the zoom lens is focused on an object point at infinity, where FIGS. 2A, 2B, 2C, 2D are for the wide angle end, FIGS. 2E, 2F, 2G, 2H are for the intermediate focal length, and FIGS. 2I, 2J, 2K, 2L are for the telephoto end;

FIGS. 4A, 4B, 4C, 4D, 4E, 4F, 4G, 4H, 4I, 4J, 4K and 4L are diagrams showing spherical aberration, astigmatism, distortion, and chromatic aberration of magnification of the zoom lens according to the second embodiment in the state in which the zoom lens is focused on an object point at infinity, where FIGS. 4A, 4B, 4C, 4D are for the wide angle end, FIGS. 4E, 4F, 4G, 4H are for the intermediate focal length, and FIGS. 4I, 4J, 4K, 4L are for the telephoto end;

FIGS. 5A, 5B, and 5C are cross sectional views taken along the optical axis, showing the optical configuration of a zoom lens according to a third embodiment of the present invention in the state in which the zoom lens is focused on an object point at infinity, respectively at the wide angle end, at an intermediate focal length, and at the telephoto end;

FIGS. 6A, 6B, 6C, 6D are for the wide angle end, FIGS. 6E, 6F, 6G, 6H are for the intermediate focal length, and FIGS. 6I, 6J, 6K, 6L are for the telephoto end;

FIGS. 7A, 7B, and 7C are cross sectional views taken along the optical axis, showing the optical configuration of a zoom lens according to a fourth embodiment of the present invention in the state in which the zoom lens is focused on an object point at infinity, respectively at the wide angle end, at an intermediate focal length, and at the telephoto end;

FIGS. 8A, 8B, 8C, 8D, 8E, 8F, 8G, 8H, 8I, 8J, 8K and 8L are diagrams showing spherical aberration, astigmatism, distortion, and chromatic aberration of magnification of the zoom lens according to the fourth embodiment in the state in which the zoom lens is focused on an object point at infinity, where FIGS. 8A, 8B, 8C, 8D are for the wide angle end, FIGS. 8E, 8F, 8G, 8H are for the intermediate focal length, and FIGS. 8I, 8J, 8K, 8L are for the telephoto end;

FIGS. 9A, 9B, and 9C are cross sectional views taken along the optical axis, showing the optical configuration of a zoom lens according to a fifth embodiment of the present invention in the state in which the zoom lens is focused on an object point at infinity, respectively at the wide angle end, at an intermediate focal length, and at the telephoto end;

FIGS. 10A, 10B, 10C, 10D, 10E, 10F, 10G, 10H, 10I, 10J, 10K and 10L are diagrams showing spherical aberration, astigmatism, distortion, and chromatic aberration of magnification of the zoom lens according to the fifth embodiment in the state in which the zoom lens is focused on an object point at infinity, where FIGS. 10A, 10B, 10C, 10D are for the wide angle end, FIGS. 10E, 10F, 10G, 10H are for the intermediate focal length, and FIGS. 10I, 10J, 10K, 10L are for the telephoto end;

FIGS. 11A, 11B, and 11C are cross sectional views taken along the optical axis, showing the optical configuration of a zoom lens according to a sixth embodiment of the present invention in the state in which the zoom lens is focused on an object point at infinity, respectively at the wide angle end, at an intermediate focal length, and at the telephoto end;

FIGS. 12A, 12B, 12C, 12D, 12E, 12F, 12G, 12H, 12I, 12J, 12K and 12L are diagrams showing spherical aberration, astigmatism, distortion, and chromatic aberration of magnification of the zoom lens according to the sixth embodiment in the state in which the zoom lens is focused on an object point at infinity, where FIGS. 12A, 12B, 12C, 12D are for the wide angle end, FIGS. 12E, 12F, 12G, 12H are for the intermediate focal length, and FIGS. 12I, 12J, 12K, 12L are for the telephoto end;

FIGS. 13A, 13B, and 13C are cross sectional views taken along the optical axis, showing the optical configuration of a zoom lens according to a seventh embodiment of the present invention in the state in which the zoom lens is focused on an object point at infinity, respectively at the wide angle end, at an intermediate focal length, and at the telephoto end;

FIGS. 14A, 14B, 14C, 14D, 14E, 14F, 14G, 14H, 14I, 14J, 14K and 14L are diagrams showing spherical aberration, astigmatism, distortion, and chromatic aberration of magnification of the zoom lens according to the seventh embodiment in the state in which the zoom lens is focused on an object point at infinity, where FIGS. 14A, 14B, 14C, 14D are for the wide angle end, FIGS. 14E, 14F, 14G, 14H are for the intermediate focal length, and FIGS. 14I, 14J, 14K, 14L are for the telephoto end;

FIG. 19 is a block diagram of a relevant internal circuit of the digital camera shown in FIG. 16.

DETAILED DESCRIPTION OF THE INVENTION

Figure 3A:
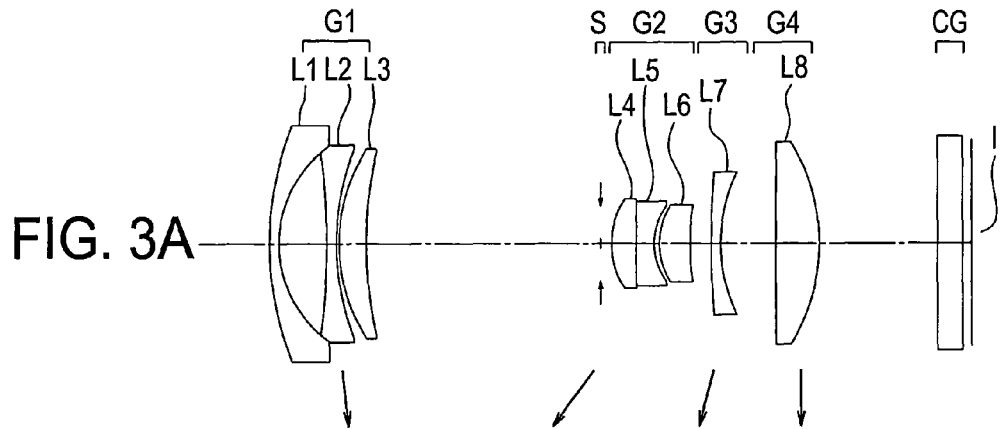
FIGS. 3A, 3B, and 3C are cross sectional views taken along the optical axis, showing the optical configuration of a zoom lens according to a second embodiment of the present invention in the state in which the zoom lens is focused on an object point at infinity, respectively at the wide angle end, at an intermediate focal length, and at the telephoto end.

In the following, embodiments of the image forming optical system in which an image forming optical system according to the invention is applied to zoom optical systems will be described in detail with reference to the drawings. It should be understood that the present invention is not limited by the embodiments.

Although a lot of specific details will be described in the following description of some modes of the invention for the purposes of illustration, various modifications and changes can be made to the details without departing from the scope of the invention. Exemplary modes of the invention will be described in the following without any intension of invalidating the generality of or imposing any limitations on the claimed invention.

Prior to the description of the embodiments, the operation and effects of the image forming optical system according to some modes of the invention will be described.

A zoom lens according to a mode of the invention includes, in order from its object side, a negative first lens unit G1, a positive second lens unit G2, a negative third lens unit G3, and a positive fourth lens unit G4, wherein the air gaps between the lens units are variable during zooming, the first lens unit G1 includes one positive lens, the second lens unit G2 includes one negative lens, the third lens unit G3 consists of one or two lens components and the fourth lens unit G4 consists of one lens component.

The term "lens component" refers to a single lens or a cemented lens.

In order to make the zoom lens suitable for use as a zoom lens that is required to have a somewhat long back focus, the negative third lens unit is additionally provided between the two positive lenses in the three unit zoom lens having a negative lens unit, a positive lens unit, and a positive lens unit that is disclosed in the aforementioned prior art documents. In this configuration, the refracting power of the composite system made up of the negative third lens unit and the last positive lens unit can be made low. In consequence, the amount of movement of the second lens unit, which provides the magnification change, can be made small. In addition, the lens units may be moved during zooming from the wide angle end to the telephoto end in such a way that the distance between the positive second lens unit and the negative third lens unit increases. This will suppress an increase in the overall length of the zoom lens in the zoom range near the telephoto end. These are major features of the zoom lens according to this mode.

For the above reasons, the four unit configuration including a negative lens unit, a positive lens unit, a negative lens unit, and a positive lens unit is the best configuration of optical systems that are required to have a somewhat long back focus and used with an image pickup element having a somewhat large format size. The composite system made up of the third and the subsequent lens units provides an important effect in correcting off-axis aberrations such as the variation in astigmatism, though its refracting power is low.

The optical system disclosed in the aforementioned prior art document Japanese Patent Application Laid-Open No. 2003-131130 is composed of four lens units including, in order from its object side, a negative lens unit, a positive lens unit, a negative lens unit, and a positive lens unit. This optical system is a zoom lens for use in a compact camera with a short back focus. Therefore, the negative third lens unit is not required to cancel the refracting power of the positive fourth lens unit largely. Its overall length does not increase in the telephoto zoom range, and such an increase in the overall length is not addressed in this document. This also applies to the optical systems disclosed in the other prior art documents.

In the case of this mode of the invention, an object is to provide a slim zoom lens that is short in the overall length while having a somewhat long back focus. Such a zoom lens tends to have a large overall length in the telephoto zoom range, and therefore, what is most important is to reduce the overall length of the zoom lens in the telephoto zoom range which is a specific problem of the above object.

To avoid an increase in the overall length, it is preferred that the change in the distance between the positive second lens unit and the negative third lens unit or the amounts of movement of the respective lens units during zooming from the wide angle end to the telephoto end satisfy the following conditional expression (1):

$$0 < M3/M2 < 0.55 \quad (1),$$

where M2 is the amount of movement of the second lens unit during zooming from the wide angle end to the telephoto end in the state in which the zoom lens is focused on an object point at infinity, M3 is the amount of movement of the third lens unit during zooming from the wide angle end to the telephoto end in the state in which the zoom lens is focused on an object point at infinity.

If the upper limit of conditional expression (1) is exceeded, the overall optical length will tend to increase at the telephoto end.

On the other hand, if the lower limit of conditional expression (1) is not reached, it will be difficult to achieve a desired zoom ratio while keeping the amounts of movement of the lens units within a predetermined range. Then, if we dare to design a zoom lens having a reduced overall length at the telephoto end and a desired zoom ratio, the zoom lens will tend to suffer from large variations in coma and astigmatism during zooming.

It is more preferred that the following conditional expression (1') be satisfied instead of conditional expression (1):

$$0.1 < M3/M2 < 0.54 \quad (1').$$

It is still more preferred that the following conditional expression (1") be satisfied instead of conditional expression (1):

$$0.2 < M3/M2 < 0.54 \quad (1").$$

In order to achieve a reduction in the size of the overall optical length while ensuring a somewhat long back focus and an appropriate zoom ratio, it is preferred that the following conditional expression (2) concerning the relationship between the refracting power of the third lens unit and the refracting power of the fourth lens unit be satisfied:

$$0.5 < f4/|f3| < 2 \quad (2),$$

where f3 is the focal length of the third lens unit, and f4 is the focal length of the fourth lens unit.

If the upper limit of conditional expression (2) is exceeded, the reduction in the overall length will lead to deterioration in off-axis aberrations such as variation in astigmatism during zooming.

On the other hand, if the lower limit of conditional expression (2) is not reached, it will be difficult to achieve a desired zoom ratio while keeping the amounts of movement of the lens units within a predetermined range (or keeping the overall optical length within a predetermined range).

It is more preferred that the following conditional expression (2') be satisfied instead of conditional expression (2):

$$0.6 < f4/|f3| < 1.7 \quad (2').$$

It is still more preferred that the following conditional expression (2") be satisfied instead of conditional expression (2):

$$0.7 < f4/|f3| < 1.4 \quad (2").$$

In order to ensure an appropriately large back focus and to reduce an increase in the overall length in the telephoto zoom range, it is preferred that the second to fourth lens units satisfy the following conditional expression (3):

$$-0.9 < \beta_{234W} < -0.4 \quad (3)$$

where $\beta_{234W}$ is the magnification of the composite system made up of the second to fourth lens units at the wide angle end in the state in which the zoom lens is focused on an object point at infinity.

Reducing the overall length while keeping a somewhat long back focus leads to a high composite magnification of the second and all the subsequent lens units. Consequently, the overall length in the telephoto zoom range tends to become large. Even if the negative third unit is introduced to suppress the increase, it had better that the magnification of the composite system made up of the second to fourth lens units do not become so large.

If the lower limit of conditional expression (3) is not reached, the overall length will tend to increase in the telephoto zoom range.

On the other hand, if the upper limit of conditional expression (3) is exceeded, it will be difficult to make the back focus appropriately large. Then, if we dare to design a zoom lens having a reduced overall length at the telephoto end and a desired back focus, the zoom lens will tend to suffer from large variations in coma and astigmatism during zooming.

It is more preferred that the following conditional expression (3') be satisfied instead of conditional expression (3):

$$-0.8 < \beta_{234W} < -0.44 \quad (3').$$

It is still more preferred that the following conditional expression (3'') be satisfied instead of conditional expression (3)

$$-0.7 < \beta_{234W} < -0.47 \quad (3'').$$

In order to reduce the amount of movement of the second lens unit, it is preferred that the magnification of the second lens unit satisfy the following conditional expression (4):

$$-0.8 < \beta_{2W} < -0.407 \quad (4),$$

where $\beta_{2W}$ is the composite magnification of the second lens unit at the wide angle end in the state in which the zoom lens is focused on an object point at infinity. The smaller the absolute value of the magnification of the second lens unit is, the smaller the amount of movement of the second lens unit can be made.

If the lower limit of conditional expression (4) is not reached, the amount of movement of the second lens unit will become large, making it difficult to achieve a desired zoom ratio while keeping the overall length of the zoom lens within an acceptable range.

If the upper limit of conditional expression (4) is exceeded, it will be difficult to make the back focus longer than a certain length. Then, if we dare to design a zoom lens having a reduced overall length at the telephoto end and a desired back focus, the zoom lens will tend to suffer from large variations in coma and astigmatism during zooming.

It is more preferred that the following conditional expression (4') be satisfied instead of conditional expression (4)

$$-0.7 < \beta_{2W} < -0.408 \quad (4').$$

It is still more preferred that the following conditional expression (4'') be satisfied instead of conditional expression (4):

$$-0.6 < \beta_{2W} < -0.41 \quad (4'').$$

It is preferred that the fourth lens unit do not move during zooming. This can lead to simplification of the lens barrel mechanism and size reduction. Even when this is the case, the distance between the third lens unit G3 and the fourth lens unit G4 is still variable, aberration correction can be achieved practically satisfactorily.

In order to reduce the amount of movement of the second lens unit, it is preferred that the refracting power of the second lens unit satisfy the following conditional expression (5):

$$0.9 < f_W/f_2 < 1.6 \quad (5),$$

where $f_2$ is the composite focal length of the second lens unit.

The higher the refracting power of the second lens unit is, the smaller the overall optical length of the entire imaging optical system and the amount of movement of the second lens unit can be made.

If the lower limit of conditional expression (5) is not reached, the amount of movement of the second lens unit and the overall optical length will tend to be large.

On the other hand, if the upper limit of conditional expression (5) is exceeded, it will be difficult to make the back focus larger than a certain length and to correct aberrations (in particular coma and astigmatism).

It is more preferred that the following conditional expression (5') be satisfied instead of conditional expression (5):

$$1 < f_W/f_2 < 1.5 \quad (5').$$

It is still more preferred that the following conditional expression (5'') be satisfied instead of conditional expression (5):

$$1.1 < f_W/f_2 < 1.4 \quad (5'').$$

When the first lens unit is composed of two negative lenses L111, L112 and one positive lens L12 arranged in order from the object side, it is preferred that following conditional expression (6) be satisfied:

$$1 < SF111 - SF112 < 2.5 \quad (6),$$

where SF111 is defined by the following equation:

$$SF111 = (R_{111F} + R_{111R})/(R_{111F} - R_{111R}) \quad (6a)$$

SF112 is defined by the following equation:

$$SF112 = (R_{112F} + R_{112R})/(R_{112F} - R_{112R}) \quad (6b),$$

$R_{111F}$ is the radius of curvature of the object side surface of the first negative lens L111 in the first lens unit on the optical axis, $R_{111R}$ is the radius of curvature of the image side surface of the first negative lens L111 in the first lens unit on the optical axis, $R_{112F}$ is the radius of curvature of the object side surface of the second negative lens L112 in the first lens unit on the optical axis, and $R_{112R}$ is the radius of curvature of the image side surface of the second negative lens L112 in the first lens unit on the optical axis.

If the lower limit of conditional expression (6) is not reached, it will be difficult to achieve well-balanced, excellent correction of distortion, astigmatism, and coma, which tend to occur in the first lens unit.

If the upper limit of conditional expression (6) is exceeded, it will be necessary to provide a large air gap between the negative lens L111 and the negative lens L112 to prevent the interference of them. This contradicts the intended slimming.

It is more preferred that the following conditional expression (6') be satisfied instead of conditional expression (6)

$$1 < SF111 - SF112 < 2.3 \quad (6').$$

It is still more preferred that the following conditional expression (6'') be satisfied instead of conditional expression (6):

$$1 < SF111 - SF112 < 2.1 \quad (6'').$$

When the first lens unit is composed of two negative lenses L111, L112 and one positive lens L12 arranged in order from the object side, it is preferred that the following conditional expression (7) be satisfied:

$$0.2 < R_{12F}/R_{12R} < 1 \quad (7),$$

where $R_{112R}$ is the radius of curvature of the image side surface of the second negative lens L112 in the first lens unit on the optical axis, and $R_{12F}$ is the radius of curvature of the object side surface of the positive lens L12 in the first lens unit on the optical axis.

If the lower limit of conditional expression (7) is not reached, it will be difficult to achieve well-balanced, excellent correction of distortion, astigmatism, and coma, which tend to occur in the first lens unit.

If the upper limit of conditional expression (7) is exceeded, it will be necessary to provide a large air gap between the negative lens L112 and the positive lens L12 to prevent the interference of them. This contradicts the intended slimming.

It is more preferred that the following conditional expression (7') be satisfied instead of conditional expression (7):

$$0.3 < R_{12F}/R_{112R} < 0.8 \quad (7').$$

It is still more preferred that the following conditional expression (7") be satisfied instead of conditional expression (7):

$$0.4 < R_{12F}/R_{112R} < 0.7 \quad (7").$$

When the first lens unit is composed of two negative lenses L111, L112 and one positive lens L12 arranged in order from the object side, it is preferred that the following conditional expression (8) be satisfied:

$$0.001 < d_{12}/fw < 0.1 \quad (8),$$

where $d_{12}$ is the air gap on the optical axis between the second negative lens L112 and the positive lens L12 in the first lens unit.

If the lower limit of conditional expression (8) is not reached, it will be difficult to achieve well-balanced, excellent correction of distortion, astigmatism, and coma, which tend to occur in the first lens unit.

If the upper limit of conditional expression (8) is exceeded, the first lens unit will have a large thickness. This contradicts the intended slimming.

It is more preferred that the following conditional expression (8') be satisfied instead of conditional expression (8):

$$0.005 < d_{12}/fw < 0.06 \quad (8').$$

It is still more preferred that the following conditional expression (8") be satisfied instead of conditional expression (8):

$$0.01 < d_{12}/fw < 0.03 \quad (8").$$

When the first lens unit is composed of one negative lens L11 and one positive lens L12 arranged in order from the object side, it is preferred that the following condition be satisfied:

$$0.4 < (R_{11F} + R_{11R})/(R_{11F} - R_{11R}) < 1.3 \quad (9),$$

where $R_{11F}$ is the radius of curvature of the object side surface of the negative lens L11 in the first lens unit on the optical axis, and $R_{11R}$ is the radius of curvature of the image side surface of the negative lens L11 in the first lens unit on the optical axis.

If the lower limit of conditional expression (9) is not reached, it will be difficult to achieve well-balanced, excellent correction of distortion, astigmatism, and coma, which tend to occur in the first lens unit.

If the upper limit of conditional expression (9) is exceeded, it will be difficult to achieve a reduction in the overall length.

It is more preferred that the following conditional expression (9') be satisfied instead of conditional expression (9):

$$0.5 < (R_{11F} + R_{11R})/(R_{11F} - R_{11R}) < 1.2 \quad (9').$$

It is still more preferred that the following conditional expression (9") be satisfied instead of conditional expression (9):

$$0.6 < (R_{11F} + R_{11R})/(R_{11F} - R_{11R}) < 1.1 \quad (9").$$

When the first lens unit is composed of one negative lens L11 and one positive lens L12 arranged in order from the object side, it is preferred that the following condition be satisfied:

$$-3.5 < (R_{12F} + R_{12R})/(R_{12F} - R_{12R}) \quad (10)$$

where $R_{12F}$ is the radius of curvature of the object side surface of the positive lens L12 in the first lens unit on the optical axis, and $R_{12R}$ is the radius of curvature of the image side surface of the positive lens L12 in the first lens unit on the optical axis.

If the lower limit of conditional expression (10) is not reached, it will be difficult to achieve a reduction in the overall length.

If the upper limit of conditional expression (10) is exceeded, it will be difficult to achieve well-balanced, excellent correction of distortion, astigmatism, and coma, which tend to occur in the first lens unit.

It is more preferred that the following conditional expression (10') be satisfied instead of conditional expression (10):

$$-3.4 < (R_{12F} + R_{12R})/(R_{12F} - R_{12R}) < -2.8 \quad (10').$$

It is still more preferred that the following conditional expression (10") be satisfied instead of conditional expression (10):

$$-3.3 < (R_{12F} + R_{12R})/(R_{12F} - R_{12R}) < -2.9 \quad (10").$$

When the first lens unit is composed of one negative lens L11 and one positive lens L12 arranged in order from the object side, it is preferred that the following condition be satisfied:

$$0.1 < d_{12}/fw < 0.35 \quad (11),$$

where $d_{12}$ is the air gap on the optical axis between the negative lens L11 and the positive lens L12 in the first lens unit.

If the lower limit of conditional expression (11) is not reached, it will be difficult to achieve well-balanced, excellent correction of distortion, astigmatism, and coma, which tend to occur in the first lens unit.

If the upper limit of conditional expression (11) is exceeded, the first lens unit will have a large thickness. This contradicts the intended slimming.

It is more preferred that the following conditional expression (11') be satisfied instead of conditional expression (11):

$$0.13 < d_{12}/fw < 0.32 \quad (11').$$

It is still more preferred that the following conditional expression (11") be satisfied instead of conditional expression (11):

$$0.16 < d_{12}/fw < 0.3 \quad (11").$$

It is also preferred that the second lens unit include only one negative lens and the air gap on the optical axis between this negative lens and the positive lens located just before it satisfy the following condition:

$$0 < d_{2pn}/fw < 1 \quad (12)$$

where $d_{2pn}$ is the air gap on the optical axis between the negative lens in the second lens unit and the positive lens located just before it in the second lens unit.

If the lower limit of conditional expression (12) is not reached, the lens configuration becomes physically impossible.

If the upper limit of conditional expression (12) is exceeded, correction of coma and chromatic aberration will tend to be difficult.

It is more preferred that the following conditional expression (12') be satisfied instead of conditional expression (12):

$$0<d_{2pn}/fw<0.8 \quad (12').$$

It is still more preferred that the following conditional expression (12") be satisfied instead of conditional expression (11):

$$0<d_{2pn}/fw<0.2 \quad (12").$$

When the second lens unit is composed of a positive lens L21, a negative lens L22, and a positive lens L23 arranged in order from the object side with the positive lens L21 and the negative lens L22 being cemented together, it is preferred that the following conditional expression (13) be satisfied:

$$0.2<(R_{322F}+R_{322R})/(R_{322F}-R_{322R})<1.7 \quad (13),$$

where $R_{322F}$ is the radius of curvature of the object side surface of the negative lens L22 in the second lens unit on the optical axis, and $R_{322R}$ is the radius of curvature of the image side surface of the negative lens L22 in the second lens unit on the optical axis.

If the lower limit of conditional expression (13) is not reached, it will be difficult to achieve a reduction in the overall length.

If the upper limit of conditional expression (13) is exceeded, the second lens unit will tend to interfere with the third lens unit at the wide angle end of the zoom range. Then, if we dare to design a zoom lens having a reduced overall length and an extended distance between the second lens unit and the third lens unit, a large variation in coma and astigmatism during zooming will tend to result.

It is more preferred that the following conditional expression (13') be satisfied instead of conditional expression (13):

$$0.3<(R_{322F}+R_{322R})/(R_{322F}-R_{322R})<1.6 \quad (13').$$

It is still more preferred that the following conditional expression (13") be satisfied instead of conditional expression (13):

$$0.4<(R_{322F}+R_{322R})/(R_{322F}-R_{322R})<1.5 \quad (13").$$

When the second lens unit is composed of a positive lens L21, a negative lens L22, and a positive lens L23 arranged in order from the object side with the positive lens L21 and the negative lens L22 being cemented together, it is preferred that the following conditional expression (14) be satisfied:

$$0.2<R_{22R}/R_{21F}<1 \quad (14),$$

where $R_{21F}$ is the radius of curvature of the object side surface of the positive lens L21 in the second lens unit on the optical axis, and $R_{22R}$ is the radius of curvature of image side surface of the negative lens L22 in the second lens unit on the optical axis.

If the upper limit of conditional expression (14) is exceeded, the sensitivity to decentering cannot be reduced by the cementing so effectively, though correction of aberrations of the entire optical system such as spherical aberration, coma, and astigmatism is facilitated.

If the lower limit of conditional expression (14) is not reached, it will tend to be difficult to correct aberrations of the entire optical system such as spherical aberration, coma, and astigmatism.

It is more preferred that the following conditional expression (14') be satisfied instead of conditional expression (14):

$$0.4<R_{22R}/R_{21F}<0.9 \quad (14').$$

It is still more preferred that the following conditional expression (14") be satisfied instead of conditional expression (14):

$$0.6<R_{22R}/R_{21F}<0.8 \quad (14").$$

It is preferred that the second lens unit be composed of a positive lens L21 and a negative lens L22 arranged in order from the object side and the negative lens L22 satisfy the following conditional expression (16):

$$2.5<(R_{222F}+R_{222R})/(R_{222F}-R_{222R})<5 \quad (16)$$

where $R_{222F}$ is the radius of curvature of the object side surface of the negative lens L22 in the second lens unit on the optical axis, and $R_{222R}$ is the radius of curvature of the image side surface of the negative lens L22 in the second lens unit on the optical axis.

If the lower limit of conditional expression (16) is not reached, it will be difficult to achieve a reduction in the overall length.

If the upper limit of conditional expression (16) is exceeded, the second lens unit will tend to interfere with the third lens unit at the wide angle end of the zoom range. Then, if we dare to design a zoom lens having a reduced overall length and an extended distance between the second lens unit and the third lens unit, a large variation in coma and astigmatism during zooming will tend to result.

It is more preferred that the following conditional expression (16') be satisfied instead of conditional expression (16):

$$3<(R_{222F}+R_{222R})/(R_{222F}-R_{222R})<4.5 \quad (16').$$

It is still more preferred that the following conditional expression (16") be satisfied instead of conditional expression (16):

$$3.5<(R_{222F}+R_{222R})/(R_{222F}-R_{222R})<4 \quad (16").$$

It is preferred that the third lens unit satisfy the following conditional expression (17):

$$0.5<(R_{3F}+R_{3R})/(R_{3F}-R_{3R})<2.4 \quad (17)$$

where $R_{3F}$ is the radius of curvature of the object side surface of the negative lens component located closest to the object side in the third lens unit on the optical axis, and $R_{3R}$ is the radius of curvature of the image side surface of the negative lens component located closest to the object side in the third lens unit on the optical axis.

Variations of aberrations caused by movement of the third lens unit for focusing are small. Therefore, the third lens unit is most suitable as the focusing lens unit.

If the lower limit of conditional expression (17) is not reached, a large amount of variation in spherical aberration and coma will be caused upon focusing undesirably.

If the upper limit of conditional expression (17) is exceeded, the third lens unit will tend to interfere with the fourth lens unit upon focusing onto an object at a short distance at the wide angle end of the zoom range. To achieve slimming, it is preferred that the third lens unit be composed of one lens component.

It is more preferred that the following conditional expression (17') be satisfied instead of conditional expression (17):

$$0.6<(R_{3F}+R_{3R})/(R_{3F}-R_{3R})<2.2 \quad (17').$$

It is still more preferred that the following conditional expression (17") be satisfied instead of conditional expression (17):

$$0.8<(R_{3F}+R_{3R})/(R_{3F}-R_{3R})<2 \quad (17").$$

When the third lens unit is composed of two negative lens components L31 and L32, it is preferred that a convex air lens defined by the two negative lenses L31 and L32 satisfy the following condition:

$$-0.35<(R_{31R}+R_{32F})/(R_{31R}-R_{32F})<0 \qquad (18),$$

where $R_{31R}$ is the radius of curvature of the image side surface of the negative lens L31 in the third lens unit on the optical axis, and $R_{32F}$ is the radius of curvature of the object side surface of the negative lens L32 in the third lens unit on the optical axis.

If the lower limit of conditional expression (18) is not reached, a large amount of variation in astigmatism will be caused upon focusing undesirably.

If the upper limit of conditional expression (18) is exceeded, a large amount of variation in spherical aberration and coma will be caused upon focusing undesirably.

It is more preferred that the following conditional expression (18') be satisfied instead of conditional expression (18):

$$-0.3<(R_{31}+R_{32F})/(R_{31R}-R_{32F})<-0.1 \qquad (18').$$

It is still more preferred that the following conditional expression (18") be satisfied instead of conditional expression (18):

$$-0.25<(R_{31R}+R_{32F})/(R_{31R}-R_{32F})<-0.15 \qquad (18").$$

It is preferred that the refractive index n31 with respect to the d-line of the medium of the negative lens located closest to the object side in the third lens unit and the refractive index n4 with respect to the d-line of the medium of the positive lens in the fourth lens unit satisfy the following conditional expression (19):

$$-0.2<n4-n31<0.6 \qquad (19).$$

If the lower limit of conditional expression (19) is not reached, the Petzval sum will tend to be large on the positive side.

On the other hand, if the upper limit of conditional expression (19) is exceeded, materials for the lens cannot be found actually, though correction of aberrations is not deteriorated significantly.

It is more preferred that the following conditional expression (19') be satisfied instead of conditional expression (19):

$$-0.1<n4-n31<0.4 \qquad (19').$$

It is still more preferred that the following conditional expression (19") be satisfied instead of conditional expression (19):

$$0<n4-n31<0.3 \qquad (19").$$

It is preferred that the following conditional expression (20) concerning the composite focal length f4 of the fourth lens unit be satisfied:

$$0.2<fw/f4<0.6 \qquad (20),$$

where fw is the focal length of the entire image forming optical system at the wide angle end.

If the lower limit of conditional expression (20) is not reached, it is necessary to make the refracting power of the third lens unit low, disabling the use of the third lens unit for focusing.

If the upper limit of conditional expression (20) is exceeded, the variation in the exit angle of principal rays with zooming will become undesirably large. Then, if we dare to design a zoom lens with a third lens unit having a high power and principal rays having an appropriate exit angle, large variations in coma and astigmatism upon zooming will tend to result.

It is more preferred that the following conditional expression (20') be satisfied instead of conditional expression (20):

$$0.25<fw/f4<0.55 \qquad (20').$$

It is still more preferred that the following conditional expression (20") be satisfied instead of conditional expression (20):

$$0.3<fw/f4<0.5 \qquad (20").$$

It is preferred that the fourth lens unit have a shape that satisfies the following conditional expression (21):

$$0.4<(R_{4F}+R_{4R})/(R_{4F}-R_{4R})<1.6 \qquad (21)$$

where $R_{4F}$ is the radius of curvature of the object side surface of the fourth lens unit, and $R_{4R}$ is the radius of curvature of the image side surface of the fourth lens unit.

Not reaching the lower limit of conditional expression (21) is unfavorable for reduction of the overall length.

If the upper limit of conditional expression (21) is exceeded, the fourth lens unit will tend to interfere with the third lens unit at the wide angle end. Then, if we dare to design a zoom lens with a reduced overall length and an extended distance between the third lens unit and the fourth lens unit, large variations in coma and astigmatism upon zooming will tend to result.

It is more preferred that the following conditional expression (21') be satisfied instead of conditional expression (21):

$$0.5<(R_{4F}+R_{4R})/(R_{4F}-R_{4R})<1.5 \qquad (21').$$

It is still more preferred that the following conditional expression (21") be satisfied instead of conditional expression (21):

$$0.6<(R_{4F}+R_{4R})/(R_{4F}-R_{4R})<1.4 \qquad (21").$$

When the fourth lens unit is fixed during zooming and focusing, it is preferred that the following conditional expression (22) is satisfied:

$$0.80 \le fb/fw<1.8 \qquad (22),$$

where fw is the composite focal length of the entire image forming optical system at the wide angle end, and fb is the distance from the last surface of the fourth lens unit to the Gauss image point on the optical axis.

If the lower limit of conditional expression (22) is not reached, a desired back focus will not be achieved.

If the upper limit of conditional expression (22) is exceeded, the overall length will tend to be large. Moreover, exceeding the upper limit of conditional expression (22) is unfavorable for correction of aberrations, in particular for correction of coma and distortion.

It is more preferred that the following conditional expression (22') be satisfied instead of conditional expression (22):

$$0.9<fb/fw<1.6 \qquad (22').$$

It is still more preferred that the following conditional expression (22") be satisfied instead of conditional expression (22):

$$1<fb/fw<1.4 \qquad (22").$$

An electronic image pickup apparatus according to a mode of the invention includes the image forming optical system described in the foregoing, an electronic image pickup element, and an image processing unit that processes image data obtained by picking up an image formed through the image forming optical system by the electronic image pickup element and outputs image data having a deformed image shape, wherein the image forming optical system satisfies the following conditional expression (A) when it is focused on an object point at infinity:

$$0.7 < y_{07}/(fw \times \tan \omega_{07w}) < 0.97 \quad (A)$$

where $y_{07}$ is expressed by equation $y_{07}=0.7 \times y_{10}$, $y_{10}$ being the distance from the center of an effective image pickup area (i.e. the area in which an image can be picked up) of the electronic image pickup element to a point farthest from the center within the effective image pickup area (this distance being defined as the largest image height), $\omega_{07w}$ is the angle between the optical axis and the direction toward an object point corresponding to an image point on the image pickup surface at a distance equal to $y_{07}$ from the center of the image pickup surface at the wide angle end in the state in which the zoom lens is focused on an object point at infinity, and fw is the focal length of the entire image forming optical system at the wide angle end in the state in which the zoom lens is focused on an object point at infinity.

In the above-described image forming optical system, it is possible to make the overall length of the optical system and the collapsed thickness of the optical system small without deterioration of chromatic aberration. Therefore, the use of such an optical system in an electronic image pickup apparatus enables providing a slim electronic image pickup apparatus with which high quality images can be obtained.

In the following, embodiments of the image forming optical system and the image pickup apparatus according to the present invention will be described in detail with reference to the drawings. It should be understood that the present invention is not limited by the embodiments.

Here, a zoom lens according to a first embodiment will be described. FIGS. 1A, 1B, and 1C are cross sectional views taken along the optical axis, showing the optical configuration of the zoom lens according to the first embodiment in the state in which the zoom lens is focused on an object point at infinity respectively at the wide angle end, in an intermediate focal length state, and at the telephoto end.

FIGS. 2A, 2B, 2C, 2D, 2E, 2F, 2G, 2H, 2I, 2J, 2K and 2L are diagrams showing spherical aberration (SA), astigmatism (AS), distortion (DT), and chromatic aberration of magnification (CC) of the zoom lens according to the first embodiment in the state in which the zoom lens is focused on an object point at infinity, where FIGS. 2A, 2B, 2C, 2D are for the wide angle end, FIGS. 2E, 2F, 2G, 2H are for the intermediate focal length state, and FIGS. 2I, 2J, 2K, 2L are for the telephoto end. The sign "ω" in the diagrams represents the half angle of view. The same symbols are also used in the aberration diagrams for the other embodiments described later.

As shown in FIGS. 1A, 1B, and 1C, the zoom lens according to the first embodiment includes, in order from its object side, a first lens unit G1, an aperture stop S, a second lens unit G2, a third lens unit G3, and a fourth lens unit G4. In the cross sectional views of the zoom lenses according to this and all the other embodiments described in the following, a low pass filter is denoted by LPF, a cover glass is denoted by CG, and the image pickup surface of an electronic image pickup element is denoted by I.

The first lens unit G1 is composed of a negative meniscus lens L1 having a convex surface directed toward the object side, a biconcave negative lens L2, and a positive meniscus lens L3 having a convex surface directed toward the object side. The first lens unit G1 has a negative refracting power as a whole.

The second lens unit G2 is composed of a cemented lens made up of a positive meniscus lens L4 having a convex surface directed toward the object side, a negative meniscus lens L5 having a convex surface directed toward the object side, and a positive meniscus lens L6 having a convex surface directed toward the object side. The second lens unit G2 has a positive refracting power as a whole.

The third lens unit G3 is composed of a negative meniscus lens L7 having a convex surface directed toward the object side and a negative meniscus lens L8 having a convex surface directed toward the image side. The third lens unit G3 has a negative refracting power as a whole The fourth lens unit G4 is composed of a biconvex positive lens L9. The fourth lens unit G4 has a positive refracting power as a whole.

During zooming from the wide angle end to the telephoto end, the first lens unit G1 moves first toward the image side and thereafter reverses its direction to move toward the object side, the second lens unit G2 moves toward the object side with the aperture stop S, the third lens unit G3 moves toward the object side, and the fourth lens unit G4 is fixed.

There are five aspheric surfaces, which include the object side surface of the biconcave negative lens L2 in the first lens unit G1, the image side surface of the image side positive meniscus lens L6 in the second lens unit G2, the image side surface of the object side negative meniscus lens L7 in the third lens unit G3, the object side surface of the image side negative meniscus lens L8 in the third lens unit G3, and the image side surface of the biconvex positive lens L9 in the fourth lens unit G4.

Figure 3B:
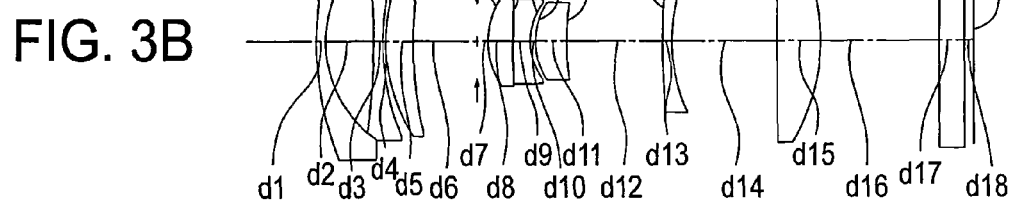
Figure 3C:
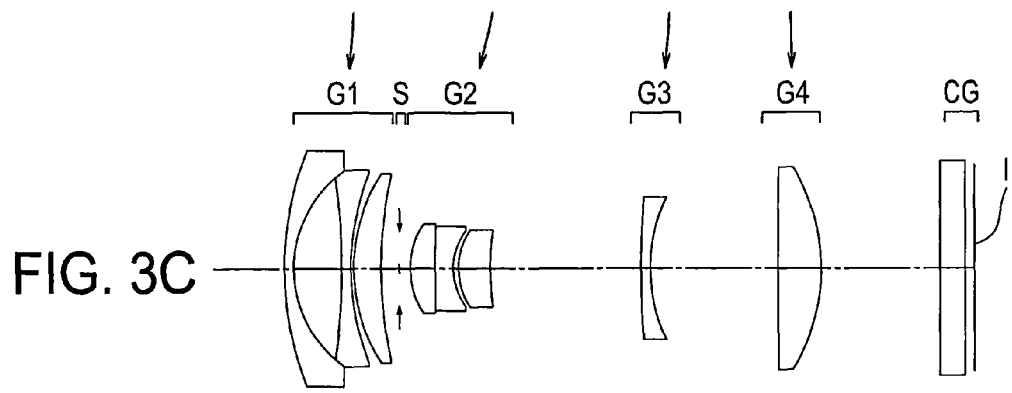
Figure 6A:
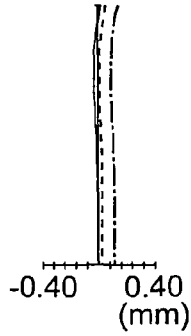
FIGS. 6A, 6B, 6C, 6D, 6E, 6F, 6G, 6H, 6I, 6J, 6K and 6L are diagrams showing spherical aberration, astigmatism, distortion, and chromatic aberration of magnification of the zoom lens according to the third embodiment in the state in which the zoom lens is focused on an object point at infinity, where
Figure 6B:
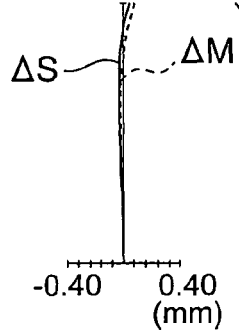
Figure 6C:
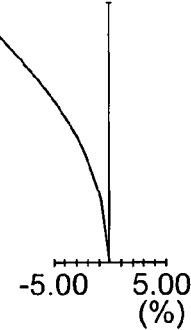
Figure 6D:
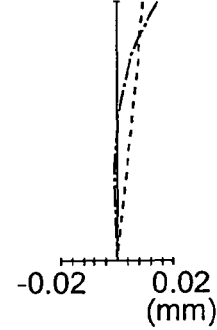
Figure 6E:
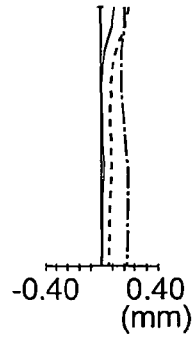
Figure 6F:
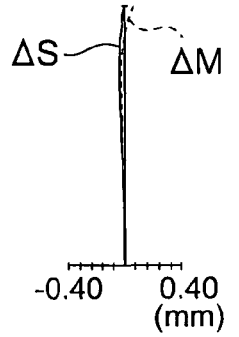
Figure 6G:
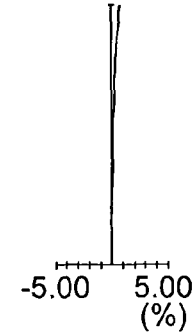
Figure 6H:
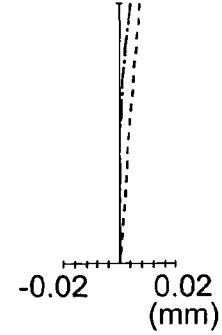
Figure 6I:
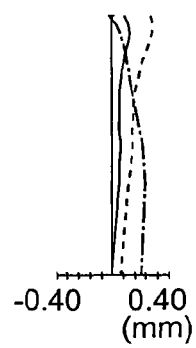
Figure 6J:
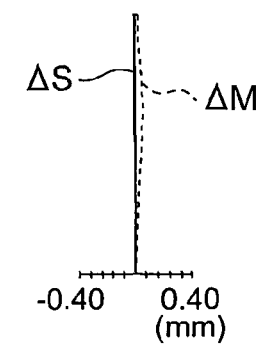
Figure 6K:
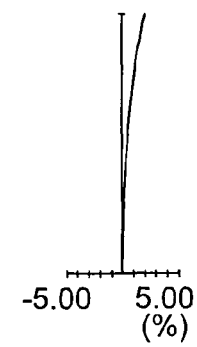
Figure 6L:
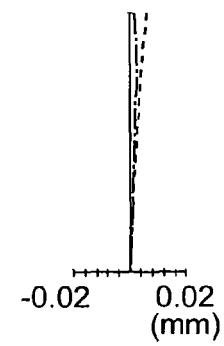

Next, a zoom lens according to a second embodiment will be described. FIGS. 3A, 3B, and 3C are cross sectional views taken along the optical axis, showing the optical configuration of the zoom lens according to the second embodiment in the state in which the zoom lens is focused on an object point at infinity respectively at the wide angle end, in an intermediate focal length state, and at the telephoto end.

FIGS. 4A, 4B, 4C, 4D, 4E, 4F, 4G, 4H, 4I, 4J, 4K and 4L are diagrams showing spherical aberration (SA), astigmatism (AS), distortion (DT), and chromatic aberration of magnification (CC) of the zoom lens according to the second embodiment in the state in which the zoom lens is focused on an object point at infinity, where FIGS. 4A, 4B, 4C, 4D are for the wide angle end, FIGS. 4E, 4F, 4G, 4H are for the intermediate focal length state, and FIGS. 4I, 4J, 4K, 4L are for the telephoto end.

As shown in FIGS. 3A, 3B, and 3C, the zoom lens according to the second embodiment includes, in order from its object side, a first lens unit G1, an aperture stop S, a second lens unit G2, a third lens unit G3, and a fourth lens unit G4.

The first lens unit G1 is composed of a negative meniscus lens L1 having a convex surface directed toward the object side, a biconcave negative lens L2, and a positive meniscus lens L3 having a convex surface directed toward the object side. The first lens unit G1 has a negative refracting power as a whole.

The second lens unit G2 is composed of a cemented lens made up of a positive meniscus lens L4 having a convex surface directed toward the object side and a negative meniscus lens L5 having a convex surface directed toward the object side, and a positive meniscus lens L6 having a convex surface directed toward the object side. The second lens unit G2 has a positive refracting power as a whole.

The third lens unit G3 is composed of a negative meniscus lens L7 having a convex surface directed toward the object side. The third lens unit G3 has a negative refracting power as a whole The fourth lens unit G4 is composed of a biconvex positive lens L8. The fourth lens unit G4 has a positive refracting power as a whole.

During zooming from the wide angle end to the telephoto end, the first lens unit G1 moves first toward the image side and thereafter reverses its direction to move toward the object side, the second lens unit G2 moves toward the object side with the aperture stop S, the third lens unit G3 moves toward the object side, and the fourth lens unit G4 is fixed.

There are two aspheric surfaces, which include the image side surface of the image side positive meniscus lens L6 in the second lens unit G2, and the image side surface of the negative meniscus lens L7 in the third lens unit G3.

Next, a zoom lens according to a third embodiment will be described. FIGS. 5A, 5B, and 5C are cross sectional views taken along the optical axis, showing the optical configuration of the zoom lens according to the third embodiment in the state in which the zoom lens is focused on an object point at infinity respectively at the wide angle end, in an intermediate focal length state, and at the telephoto end.

FIGS. 6A, 6B, 6C, 6D, 6E, 6F, 6G, 6H, 6I, 6J, 6K and 6L are diagrams showing spherical aberration (SA), astigmatism (AS), distortion (DT), and chromatic aberration of magnification (CC) of the zoom lens according to the third embodiment in the state in which the zoom lens is focused on an object point at infinity, where FIGS. 6A, 6B, 6C, 6D are for the wide angle end, FIGS. 6E, 6F, 6G, 6H are for the intermediate focal length state, and FIGS. 6I, 6J, 6K, 6L are is for the telephoto end.

As shown in FIGS. 5A, 5B, and 5C, the zoom lens according to the third embodiment includes, in order from its object side, a first lens unit G1, an aperture stop S, a second lens unit G2, a third lens unit G3, and a fourth lens unit G4.

The first lens unit G1 is composed of a negative meniscus lens L1 having a convex surface directed toward the object side, a biconcave negative lens L2, and a positive meniscus lens L3 having a convex surface directed toward the object side. The first lens unit G1 has a negative refracting power as a whole.

The second lens unit G2 is composed of a cemented lens made up of a positive meniscus lens L4 having a convex surface directed toward the object side and a negative meniscus lens L5 having a convex surface directed toward the object side, and a positive meniscus lens L6 having a convex surface directed toward the object side. The second lens unit G2 has a positive refracting power as a whole.

The third lens unit G3 is composed of a negative meniscus lens L7 having a convex surface directed toward the object side. The third lens unit G3 has a negative refracting power as a whole The fourth lens unit G4 is composed of a biconvex positive lens L8. The fourth lens unit G4 has a positive refracting power as a whole.

During zooming from the wide angle end to the telephoto end, the first lens unit G1 moves first toward the image side and thereafter reverses its direction to move toward the object side, the second lens unit G2 moves toward the object side with the aperture stop S, the third lens unit G3 moves toward the object side, and the fourth lens unit G4 is fixed.

There are two aspheric surfaces, which include the image side surface of the image side positive meniscus lens L6 in the second lens unit G2, and the image side surface of the negative meniscus lens L7 in the third lens unit G3.

Next, a zoom lens according to a fourth embodiment will be described. FIGS. 7A, 7B, and 7C are cross sectional views taken along the optical axis, showing the optical configuration of the zoom lens according to the fourth embodiment in the state in which the zoom lens is focused on an object point at infinity respectively at the wide angle end, in an intermediate focal length state, and at the telephoto end.

FIGS. 8A, 8B, 8C, 8D, 8E, 8F, 8G, 8H, 8I, 8J, 8K and 8L are diagrams showing spherical aberration (SA), astigmatism (AS), distortion (DT), and chromatic aberration of magnification (CC) of the zoom lens according to the fourth embodiment in the state in which the zoom lens is focused on an object point at infinity, where FIGS. 8A, 8B, 8C, 8D are for the wide angle end, FIGS. 8E, 8F, 8G, 8H are for the intermediate focal length state, and FIGS. 8I, 8J, 8K, 8L are for the telephoto end.

As shown in FIGS. 7A, 7B, and 7C, the zoom lens according to the fourth embodiment includes, in order from its object side, a first lens unit G1, an aperture stop S, a second lens unit G2, a third lens unit G3, and a fourth lens unit G4.

The first lens unit G1 is composed of a negative meniscus lens L1 having a convex surface directed toward the object side, a biconcave negative lens L2, and a positive meniscus lens L3 having a convex surface directed toward the object side. The first lens unit G1 has a negative refracting power as a whole.

The second lens unit G2 is composed of a biconvex positive lens L4 and a positive meniscus lens L5 having a convex surface directed toward the object side. The second lens unit G2 has a positive refracting power as a whole.

The third lens unit G3 is composed of a biconcave negative lens L6. The third lens unit G3 has a negative refracting power as a whole The fourth lens unit G4 is composed of a positive meniscus lens L7 having a convex surface directed toward the image side. The fourth lens unit G4 has a positive refracting power as a whole.

During zooming from the wide angle end to the telephoto end, the first lens unit G1 moves first toward the image side and thereafter reverses its direction to move toward the object side, the second lens unit G2 moves toward the object side with the aperture stop S, the third lens unit G3 moves toward the object side, and the fourth lens unit G4 is fixed.

There are three aspheric surfaces, which include the object side surface of the biconvex positive lens L4 in the second lens unit G2, the image side surface of the positive meniscus lens L5 in the second lens unit G2, and the image side surface of the biconvex negative lens L6 in the third lens unit G3.

Next, a zoom lens according to a fifth embodiment will be described. FIGS. 9A, 9B, and 9C are cross sectional views taken along the optical axis, showing the optical configuration of the zoom lens according to the fifth embodiment in the state in which the zoom lens is focused on an object point at infinity respectively at the wide angle end, in an intermediate focal length state, and at the telephoto end.

FIGS. 10A, 10B, 10C, 10D, 10E, 10F, 10G, 10H, 10I, 10J, 10K and 10L are diagrams showing spherical aberration (SA), astigmatism (AS), distortion (DT), and chromatic aberration of magnification (CC) of the zoom lens according to the fifth embodiment in the state in which the zoom lens is focused on an object point at infinity, where FIGS. 10A, 10B, 10C, 10D are for the wide angle end, FIGS. 10E, 10F, 10G, 10H are for the intermediate focal length state, and FIGS. 10I, 10J, 10K, 10L are for the telephoto end.

As shown in FIGS. 9A, 9B, and 9C, the zoom lens according to the fifth embodiment includes, in order from its object side, a first lens unit G1, an aperture stop S, a second lens unit G2, a third lens unit G3, and a fourth lens unit G4.

The first lens unit G1 is composed of a negative meniscus lens L1 having a convex surface directed toward the object side and a positive meniscus lens L2 having a convex surface directed toward the object side. The first lens unit G1 has a negative refracting power as a whole.

The second lens unit G2 is composed of a cemented lens made up of a positive meniscus lens L3 having a convex surface directed toward the object side and a negative meniscus lens L4 having a convex surface directed toward the object side, and a positive meniscus lens L5 having a convex surface directed toward the object side. The second lens unit G2 has a positive refracting power as a whole.

The third lens unit G3 is composed of a negative meniscus lens L6 having a convex surface directed toward the object side. The third lens unit G3 has a negative refracting power as a whole The fourth lens unit G4 is composed of a biconvex positive lens L7. The fourth lens unit G4 has a positive refracting power as a whole.

During zooming from the wide angle end to the telephoto end, the first lens unit G1 moves first toward the image side and thereafter reverses its direction to move toward the object side, the second lens unit G2 moves toward the object side with the aperture stop S, the third lens unit G3 moves toward the object side, and the fourth lens unit G4 is fixed.

There are three aspheric surfaces, which include the image side surface of the negative meniscus lens L1 in the first lens unit G1, the image side surface of the image side positive meniscus lens L5 in the second lens unit G2, and the image side surface of the negative meniscus lens L6 in the third lens unit G3.

Next, a zoom lens according to a sixth embodiment will be described. FIGS. 11A, 11B, and 11C are cross sectional views taken along the optical axis, showing the optical configuration of the zoom lens according to the sixth embodiment in the state in which the zoom lens is focused on an object point at infinity respectively at the wide angle end, in an intermediate focal length state, and at the telephoto end.

FIGS. 12A, 12B, 12C, 12D, 12E, 12F, 12G, 12H, 12I, 12J, 12K and 12L are diagrams showing spherical aberration (SA), astigmatism (AS), distortion (DT), and chromatic aberration of magnification (CC) of the zoom lens according to the sixth embodiment in the state in which the zoom lens is focused on an object point at infinity, where FIGS. 12A, 12B, 12C, 12D are for the wide angle end, FIGS. 12E, 12F, 12G, 12H are for the intermediate focal length state, and FIGS. 12I, 12J, 12K, 12L are for the telephoto end.

As shown in FIGS. 11A, 11B, and 11C, the zoom lens according to the sixth embodiment includes, in order from its object side, a first lens unit G1, an aperture stop S, a second lens unit G2, a third lens unit G3, and a fourth lens unit G4.

The first lens unit G1 is composed of a biconcave negative lens L1 and a positive meniscus lens L2 having a convex surface directed toward the object side. The first lens unit G1 has a negative refracting power as a whole.

The second lens unit G2 is composed of a biconvex positive lens L3 and a negative meniscus lens L4 having a convex surface directed toward the object side. The second lens unit G2 has a positive refracting power as a whole.

The third lens unit G3 is composed of a negative meniscus lens L5 having a convex surface directed toward the object side. The third lens unit G3 has a negative refracting power as a whole The fourth lens unit G4 is composed of a positive meniscus lens L6 having a convex surface directed toward the image side. The fourth lens unit G4 has a positive refracting power as a whole.

During zooming from the wide angle end to the telephoto end, the first lens unit G1 moves first toward the image side and thereafter reverses its direction to move toward the object side, the second lens unit G2 moves toward the object side with the aperture stop S, the third lens unit G3 moves toward the object side, and the fourth lens unit G4 is fixed.

There are four aspheric surfaces, which include the object side surface of the biconcave negative lens L1 in the first lens unit G1, the object side surface of the biconvex positive lens L3 in the second lens unit G2, the image side surface of the negative meniscus lens L4 in the second lens unit G2, and the image side surface of the negative meniscus lens L5 in the third lens unit G3.

Next, a zoom lens according to a seventh embodiment will be described. FIGS. 13A, 13B, and 13C are cross sectional views taken along the optical axis, showing the optical configuration of the zoom lens according to the seventh embodiment in the state in which the zoom lens is focused on an object point at infinity respectively at the wide angle end, in an intermediate focal length state, and at the telephoto end.

FIGS. 14A, 14B, and 14C are diagrams showing spherical aberration (SA), astigmatism (AS), distortion (DT), and chromatic aberration of magnification (CC) of the zoom lens according to the seventh embodiment in the state in which the zoom lens is focused on an object point at infinity, where FIG. 14A is for the wide angle end, FIG. 14B is for the intermediate focal length state, and FIG. 14C is for the telephoto end.

As shown in FIGS. 13A, 13B, and 13C, the zoom lens according to the seventh embodiment includes, in order from its object side, a first lens unit G1, an aperture stop S, a second lens unit G2, a third lens unit G3, and a fourth lens unit G4.

The first lens unit G1 is composed of a negative meniscus lens L1 having a convex surface directed toward the object side, a biconcave negative lens L2, and a positive meniscus lens L3 having a convex surface directed toward the object side. The first lens unit G1 has a negative refracting power as a whole.

The second lens unit G2 is composed of a cemented lens made up of a biconvex positive lens L4 and a biconcave negative lens L5, and a positive meniscus lens L6 having a convex surface directed toward the object side. The second lens unit G2 has a positive refracting power as a whole.

The third lens unit G3 is composed of a negative meniscus lens L7 having a convex surface directed toward the object side. The third lens unit G3 has a negative refracting power as a whole The fourth lens unit G4 is composed of a biconvex positive lens L8. The fourth lens unit G4 has a positive refracting power as a whole.

During zooming from the wide angle end to the telephoto end, the first lens unit G1 moves first toward the image side and thereafter reverses its direction to move toward the object side, the second lens unit G2 moves toward the object side with the aperture stop S, the third lens unit G3 moves toward the object side, and the fourth lens unit G4 is fixed.

There are two aspheric surfaces, which include the image side surface of the positive meniscus lens L6 in the second lens unit G2, and the image side surface of the negative meniscus lens L7 in the third lens unit G3.

Numerical data of each embodiment described above is shown below. Each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe constant for each lens. $F_{NO}$ denotes an F number, f denotes a focal length of the entire zoom lens system, Further, * denotes an aspheric data, S denotes a stop.

In the numerical values of the embodiments, a surface marked "*" has an aspheric surface.

When X is let to be an optical axis with a direction of traveling of light as a positive (direction), and y is let to be in a direction orthogonal to the optical axis, a shape of the aspheric surface is described by the following expression.

$$X=(H^2/r)/[1+\{1-(K+1)(H/r)^2\}^{1/2}]+A_4H^4+A_6H^6+A_8H^8+A_{10}H^{10} \quad (a)$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e−n' (where, n is an integral number) indicates '$10^{-n}$'.

Hereinafter, these symbols are common in the following embodiments.

Furthermore, in all the embodiments, an image height and a zoom ratio are shown as below.

Example 1

Unit mm

Surface data

| Surface no. | r | d | nd | vd |
|---|---|---|---|---|
| Object plane | ∞ | ∞ | | |
| 1 | 40.000 | 1.00 | 1.88300 | 40.76 |
| 2 | 12.208 | 4.90 | | |
| 3 | −64.338 | 1.00 | 1.52542 | 55.78 |
| 4* | 29.279 | 0.29 | | |
| 5 | 20.083 | 3.03 | 1.84666 | 23.78 |
| 6 | 74.737 | Variable | | |
| 7 (Stop) | ∞ | 1.18 | | |
| 8 | 11.101 | 2.67 | 1.83400 | 37.16 |
| 9 | 239.150 | 2.87 | 1.78470 | 26.29 |
| 10 | 8.000 | 4.76 | 1.59201 | 67.02 |
| 11* | 174.731 | Variable | | |
| 12 | 62.548 | 1.00 | 1.52542 | 55.78 |
| 13* | 19.677 | 2.10 | | |
| 14* | −29.389 | 1.00 | 1.52542 | 55.78 |
| 15 | −60.000 | Variable | | |
| 16 | 165.536 | 4.01 | 1.52542 | 55.78 |
| 17* | −25.234 | Variable | | |
| 18 | ∞ | 2.66 | 1.51633 | 64.14 |
| 19 | ∞ | 1.00 | | |
| Image plane (Light receiving surface) | ∞ | | | |

Aspherical surface data

4th surface k = 0.000
A4 = −3.38982e−06, A6 = −8.51671e−08
11th surface k = 0.000
A4 = 2.83295e−04, A6 = 2.19510e−06, A8 = 8.22825e−08
13th surface k = 0.000
A4 = −3.63119e−06
14th surface k = 0.000
A4 = −3.68022e−05, A6 = −5.53193e−08
17th surface k = −0.387
A4 = −3.59810e−06

-continued

Unit mm

Various data

| | Wide angle | Inter mediate | Telephoto |
|---|---|---|---|
| Focal length | 14.47 | 30.38 | 41.64 |
| Fno. | 3.96 | 5.68 | 6.83 |
| Angle of field 2ω | 83.06 | 40.15 | 29.42 |
| BF (in air) | 15.43 | 15.44 | 15.41 |
| Lens total length (in air) | 74.12 | 69.47 | 72.60 |
| d6 | 23.22 | 5.80 | 1.23 |
| d11 | 1.76 | 9.73 | 15.69 |
| d15 | 3.89 | 8.68 | 10.45 |
| d17 | 12.64 | 12.64 | 12.64 |

Unit focal length

| f1 = −23.32 | f2 = 18.39 | f3 = −36.55 | f4 = 41.98 |
|---|---|---|---|

Example 2

Unit mm

Surface data

| Surface no. | r | d | nd | vd |
|---|---|---|---|---|
| Object plane | ∞ | ∞ | | |
| 1 | 35.000 | 1.00 | 1.83481 | 42.71 |
| 2 | 13.088 | 5.18 | | |
| 3 | −74.520 | 1.00 | 1.52249 | 59.84 |
| 4 | 27.771 | 0.30 | | |
| 5 | 19.145 | 2.95 | 1.84666 | 23.78 |
| 6 | 45.403 | Variable | | |
| 7 (Stop) | ∞ | 1.18 | | |
| 8 | 8.990 | 2.65 | 1.80610 | 40.92 |
| 9 | 214.397 | 1.88 | 1.75520 | 27.51 |
| 10 | 6.938 | 0.55 | | |
| 11 | 7.660 | 3.37 | 1.52542 | 55.78 |
| 12* | 52.825 | Variable | | |
| 13 | 100.508 | 1.00 | 1.52542 | 55.78 |
| 14* | 19.576 | Variable | | |
| 15 | 886.551 | 4.61 | 1.51633 | 64.14 |
| 16 | −21.797 | Variable | | |
| 17 | ∞ | 2.66 | 1.51633 | 64.14 |
| 18 | ∞ | 1.00 | | |
| Image plane (Light receiving surface) | ∞ | | | |

Aspherical surface data

12th surface k = 0.000
A4 = 3.93771e−04, A6 = 3.02598e−06, A8 = 1.91578e−07,
A10 = −6.16016e−10
14th surface k = 2.482
A4 = −1.04363e−06, A6 = −5.84697e−07

Various data

| | Wide angle | Inter mediate | Telephoto |
|---|---|---|---|
| Focal length | 14.28 | 29.99 | 41.13 |
| Fno. | 3.95 | 5.67 | 6.83 |
| Angle of field 2ω | 83.78 | 40.53 | 29.78 |
| BF (in air) | 15.39 | 15.39 | 15.39 |
| Lens total length (in air) | 74.09 | 69.18 | 72.72 |

| Unit mm | | | |
|---|---|---|---|
| d6 | 25.01 | 6.74 | 2.00 |
| d12 | 2.19 | 10.22 | 16.17 |
| d14 | 5.82 | 11.16 | 13.48 |
| d16 | 12.64 | 12.64 | 12.64 |

| Unit focal length | | | |
|---|---|---|---|
| f1 = −25.57 | f2 = 19.32 | f3 = −46.47 | f4 = 41.27 |

Example 3

| Unit mm | | | | |
|---|---|---|---|---|
| Surface data | | | | |
| Surface no. | r | d | nd | vd |
| Object plane | ∞ | ∞ | | |
| 1 | 36.515 | 1.00 | 1.83481 | 42.71 |
| 2 | 12.416 | 4.38 | | |
| 3 | −314.149 | 1.00 | 1.69680 | 55.53 |
| 4 | 25.508 | 0.30 | | |
| 5 | 17.363 | 2.78 | 1.84666 | 23.78 |
| 6 | 43.521 | Variable | | |
| 7 (Stop) | ∞ | 1.00 | | |
| 8 | 7.758 | 2.52 | 1.80610 | 40.92 |
| 9 | 33.630 | 1.08 | 1.75520 | 27.51 |
| 10 | 6.041 | 0.50 | | |
| 11 | 7.004 | 3.10 | 1.51633 | 64.14 |
| 12* | 132.249 | Variable | | |
| 13 | 218.112 | 1.00 | 1.52542 | 55.78 |
| 14* | 15.042 | Variable | | |
| 15 | 109.239 | 4.92 | 1.51633 | 64.14 |
| 16 | −23.263 | Variable | | |
| 17 | ∞ | 2.66 | 1.51633 | 64.14 |
| 18 | ∞ | 1.00 | | |
| Image plane (Light receiving surface) | ∞ | | | |

Aspherical surface data

12th surface k = 0.000
A4 = 4.73945e−04, A6 = 3.09311e−06, A8 = 3.90756e−07,
A10 = −4.01910e−09

14th surface k = 0.000
A4 = 3.31138e−05, A6 = −5.71483e−07, A8 = 3.04170e−09

| Various data | | | |
|---|---|---|---|
| | Wide angle | Inter mediate | Telephoto |
| Focal length | 14.01 | 29.41 | 40.32 |
| Fno. | 3.99 | 5.68 | 6.83 |
| Angle of field 2ω | 84.89 | 41.23 | 30.34 |
| BF (in air) | 15.44 | 15.43 | 15.42 |
| Lens total length (in air) | 70.14 | 65.84 | 68.96 |
| d6 | 23.07 | 6.35 | 2.00 |
| d12 | 1.98 | 8.46 | 13.01 |
| d14 | 6.08 | 12.03 | 14.97 |
| d16 | 12.64 | 12.64 | 12.64 |

| Unit mm | | | |
|---|---|---|---|
| Unit focal length | | | |
| f1 = −22.93 | f2 = 16.88 | f3 = −30.80 | f4 = 37.62 |

Example 4

| Unit mm | | | | |
|---|---|---|---|---|
| Surface data | | | | |
| Surface no. | r | d | nd | vd |
| Object plane | ∞ | ∞ | | |
| 1 | 35.000 | 1.00 | 1.81600 | 46.62 |
| 2 | 11.697 | 4.50 | | |
| 3 | −43.354 | 1.00 | 1.74100 | 52.64 |
| 4 | 50.433 | 0.30 | | |
| 5 | 22.683 | 2.70 | 1.84666 | 23.78 |
| 6 | 134.218 | Variable | | |
| 7 (Stop) | ∞ | 1.00 | | |
| 8* | 9.305 | 5.00 | 1.59201 | 67.02 |
| 9 | −36.634 | 0.30 | | |
| 10 | 19.483 | 1.82 | 2.00178 | 19.32 |
| 11* | 11.362 | Variable | | |
| 12 | −514.099 | 1.00 | 1.52542 | 55.78 |
| 13* | 19.085 | Variable | | |
| 14 | −197.750 | 3.71 | 1.74320 | 49.34 |
| 15 | −26.474 | Variable | | |
| 16 | ∞ | 2.66 | 1.51633 | 64.14 |
| 17 | ∞ | 1.00 | | |
| Image plane (Light receiving surface) | ∞ | | | |

Aspherical surface data

8th surface k = −0.642
A4 = 5.60665e−05

11th surface k = 2.252
A4 = 3.67221e−05, A6 = 7.06337e−07

13th surface k = 0.000
A4 = 4.98525e−05, A6 = −5.04103e−07

| Various data | | | |
|---|---|---|---|
| | Wide angle | Inter mediate | Telephoto |
| Focal length | 14.28 | 29.99 | 41.13 |
| Fno. | 3.83 | 5.64 | 6.83 |
| Angle of field 2ω | 83.80 | 40.52 | 29.78 |
| BF (in air) | 15.38 | 15.39 | 15.39 |
| Lens total length (in air) | 70.96 | 69.22 | 72.75 |
| d6 | 23.09 | 7.47 | 3.19 |

Example 5

Unit mm

Surface data

| Surface no. | r | d | nd | vd |
|---|---|---|---|---|
| Object plane | ∞ | ∞ | | |
| 1 | 1364.480 | 1.00 | 1.74320 | 49.34 |
| 2* | 12.109 | 4.34 | | |
| 3 | 19.946 | 2.79 | 1.80810 | 22.76 |
| 4 | 40.000 | Variable | | |
| 5 (Stop) | ∞ | 1.18 | | |
| 6 | 9.255 | 2.90 | 1.80610 | 40.92 |
| 7 | 84.927 | 1.37 | 1.75520 | 27.51 |
| 8 | 6.912 | 0.37 | | |
| 9 | 7.518 | 4.39 | 1.52542 | 55.78 |
| 10* | 43.935 | Variable | | |
| 11 | 271.958 | 1.00 | 1.52542 | 55.78 |
| 12* | 27.270 | Variable | | |
| 13 | 144.460 | 4.50 | 1.51633 | 64.14 |
| 14 | −27.024 | Variable | | |
| 15 | ∞ | 2.66 | 1.51633 | 64.14 |
| 16 | ∞ | 1.00 | | |
| Image plane (Light receiving surface) | ∞ | | | |

Aspherical surface data

2nd surface k = −0.447
A4 = −8.16356e−06, A6 = −1.43419e−08, A8 = −3.50802e−10

10th surface k = 0.000
A4 = 3.33768e−04, A6 = 3.18128e−06, A8 = 5.43295e−08,
A10 = 2.44257e−09

12th surface k = 0.000
A4 = 4.04315e−05, A6 = −2.89519e−07, A8 = 2.58942e−09

Various data

| | Wide angle | Inter mediate | Telephoto |
|---|---|---|---|
| Focal length | 15.00 | 31.50 | 43.20 |
| Fno. | 3.88 | 5.60 | 6.83 |
| Angle of field 2ω | 79.99 | 38.86 | 28.70 |
| BF (in air) | 15.39 | 15.40 | 15.39 |
| Lens total length (in air) | 74.09 | 69.10 | 74.09 |
| d4 | 26.33 | 6.78 | 2.00 |
| d11 | 3.22 | 9.69 | 14.78 |
| d13 | 6.94 | 14.35 | 17.06 |
| d15 | 12.64 | 12.64 | 12.64 |

Unit focal length

| f1 = −22.02 | f2 = 17.45 | f3 = −35.00 | f4 = 40.75 |
|---|---|---|---|

Example 6

Unit mm

Surface data

| Surface no. | r | d | nd | vd |
|---|---|---|---|---|
| Object plane | ∞ | ∞ | | |
| 1* | −75.501 | 0.80 | 1.72903 | 54.04 |
| 2 | 15.336 | 2.48 | | |
| 3 | 19.653 | 3.02 | 1.84666 | 23.78 |
| 4 | 38.000 | Variable | | |
| 5 (Stop) | ∞ | 1.00 | | |
| 6* | 7.951 | 3.40 | 1.59201 | 67.02 |
| 7 | −68.007 | 0.10 | | |
| 8 | 14.373 | 1.25 | 1.84666 | 23.78 |
| 9* | 8.170 | Variable | | |
| 10 | 153.275 | 0.80 | 1.52542 | 55.78 |
| 11* | 15.327 | Variable | | |
| 12 | −134.602 | 3.79 | 1.72916 | 54.68 |
| 13 | −21.712 | Variable | | |
| 14 | ∞ | 2.66 | 1.51633 | 64.14 |
| 15 | ∞ | 1.00 | | |
| Image plane (Light receiving surface) | ∞ | | | |

Aspherical surface data

1st surface k = 0.000
A4 = 1.76592e−05, A6 = −6.27372e−09

6th surface k = −0.897
A4 = 1.96475e−04, A6 = 9.79131e−07, A8 = −8.27903e−09

9th surface k = 0.000
A4 = 3.31794e−04, A6 = 9.99366e−06, A8 = −1.78860e−07,
A10 = 1.69952e−08

11th surface k = 0.000
A4 = 4.95674e−05, A6 = −1.81708e−06, A8 = 1.93822e−08

Various data

| | Wide angle | Inter mediate | Telephoto |
|---|---|---|---|
| Focal length | 14.40 | 30.24 | 41.47 |
| Fno. | 4.12 | 5.81 | 6.84 |
| Angle of field 2ω | 83.39 | 40.62 | 29.54 |
| BF (in air) | 16.83 | 16.83 | 16.84 |
| Lens total length (in air) | 74.08 | 65.46 | 65.14 |
| d4 | 31.14 | 9.64 | 3.40 |
| d10 | 2.38 | 10.52 | 15.55 |
| d12 | 6.14 | 12.57 | 17.31 |
| d14 | 12.64 | 12.64 | 12.64 |

Unit focal length

| f1 = −28.21 | f2 = 20.92 | f3 = −57.77 | f4 = 44.49 |
|---|---|---|---|

-continued

Unit mm

| | | | |
|---|---|---|---|
| d9 | 3.05 | 8.70 | 13.80 |
| d11 | 6.41 | 13.65 | 14.45 |
| d13 | 14.09 | 14.09 | 14.09 |

Unit focal length

| | | | |
|---|---|---|---|
| f1 = −29.55 | f2 = 18.62 | f3 = −32.48 | f4 = 35.01 |

Example 7

Unit mm

Surface data

| Surface no. | r | d | nd | vd |
|---|---|---|---|---|
| Object plane | ∞ | ∞ | | |
| 1 | 35.000 | 1.00 | 1.83481 | 42.71 |
| 2 | 12.992 | 5.01 | | |
| 3 | −74.501 | 1.00 | 1.52249 | 59.84 |
| 4 | 29.977 | 0.30 | | |
| 5 | 19.086 | 2.78 | 1.84666 | 23.78 |
| 6 | 40.000 | Variable | | |
| 7 (Stop) | ∞ | 1.18 | | |
| 8 | 10.197 | 5.00 | 1.72342 | 37.95 |
| 9 | −20.000 | 1.39 | 1.75520 | 27.51 |
| 10 | 8.061 | 0.40 | | |
| 11 | 9.259 | 3.32 | 1.74320 | 49.34 |
| 12* | 102.147 | Variable | | |
| 13 | 211.860 | 1.00 | 1.52542 | 55.78 |
| 14* | 17.188 | Variable | | |
| 15 | 159.342 | 4.85 | 1.51633 | 64.14 |
| 16 | −23.456 | Variable | | |
| 17 | ∞ | 2.66 | 1.51633 | 64.14 |
| 18 | ∞ | 1.00 | | |
| Image plane (Light receiving surface) | ∞ | | | |

Aspherical surface data

12th surface k = 0.000
A4 = 1.96340e−04, A6 = 4.78249e−07, A8 = 1.00676e−07,
A10 = −1.90930e−09

14th surface k = 1.379
A4 = 6.64542e−06, A6 = −5.19950e−07

Various data

| | Wide angle | Inter mediate | Telephoto |
|---|---|---|---|
| Focal length | 14.28 | 29.99 | 41.13 |
| Fno. | 3.82 | 5.48 | 6.60 |
| Angle of field 2ω | 83.80 | 40.52 | 29.78 |
| BF (in air) | 15.39 | 15.39 | 15.40 |
| Lens total length (in air) | 74.09 | 70.61 | 74.10 |
| d6 | 23.99 | 6.62 | 2.00 |
| d12 | 2.00 | 8.10 | 12.60 |
| d14 | 5.48 | 13.26 | 16.87 |
| d16 | 12.64 | 12.64 | 12.64 |

Unit focal length

| | | | |
|---|---|---|---|
| f1 = −24.49 | f2 = 18.11 | f3 = −35.66 | f4 = 39.96 |

Values of the conditional expressions of each of the embodiments are shown as below.

| | Example 1 | Example 2 | Example 3 | Example 4 |
|---|---|---|---|---|
| $f_w$ (Wide angle end) | 14.47 | 14.28 | 14 | 14.28 |
| $f_t$ (Telephoto end) | 41.64 | 41.13 | 40.32 | 41.13 |
| Half angle of field $\omega_w$ (Wide angle end) | −41.53 | −41.89 | −42.45 | −41.9 |
| Half angle of field $\omega_t$ (Telephoto end) | −14.71 | −14.89 | −15.17 | −14.89 |
| (1) M3/M2 | 0.3 | 0.33 | 0.42 | 0.51 |
| (2) f4/\|f3\| | 1.15 | 0.89 | 1.22 | 1.16 |
| (3) $\beta_{234w}$ | −0.62 | −0.56 | −0.61 | −0.65 |
| (4) $\beta_{2w}$ | −0.52 | −0.52 | −0.49 | −0.53 |
| (5) $f_w/f_2$ | 0.79 | 0.74 | 0.83 | 0.82 |
| (6) SF111 − SF112 | 1.5 | 1.74 | 1.18 | 2.08 |
| (7) $R_{12F}/R_{112R}$ | 0.69 | 0.69 | 0.68 | 0.45 |
| (8) $d_{12}/f_w$ | 0.02 | 0.021 | 0.021 | 0.021 |
| (9) $(R_{11F} + R_{11R})/(R_{11F} − R_{11R})$ | — | — | — | — |
| (10) $(R_{12F} + R_{12R})/(R_{12F} − R_{12R})$ | — | — | — | — |
| (11) $d_{12}/f_w$ | — | — | — | — |
| (12) $d_{2pn}/f_w$ | 0.186 | 0.044 | 0 | 0 |
| (13) $(R_{322F} + R_{322R})/(R_{322F} − R_{322R})$ | 1.07 | 1.07 | 1.44 | — |
| (14) $R_{22R}/R_{21F}$ | 0.72 | 0.77 | 0.78 | — |
| (16) $(R_{222F} + R_{222R})/(R_{222F} − R_{222R})$ | — | — | — | 3.8 |
| (17) $(R_{3F} + R_{3R})/(R_{3F} − R_{3R})$ | 1.92 | 1.48 | 1.15 | 0.93 |
| (18) $(R_{31R} + R_{32F})/(R_{31R} − R_{32F})$ | −0.2 | — | — | — |
| (19) n4 − n31 | 0 | −0.00909 | −0.00909 | −0.21778 |
| (20) $f_w/f_4$ | 0.34 | 0.35 | 0.37 | 0.35 |
| (21) $(R_{4F} + R_{4R})/(R_{4F} − R_{4R})$ | 0.74 | 0.95 | 1.15 | 1.31 |
| (22) fb/fw | 1.22 | 1.24 | 1.26 | 1.24 |

| | Example 5 | Example 6 | Example 7 |
|---|---|---|---|
| $f_w$ (Wide angle end) | 15 | 14.4 | 14.28 |
| $f_t$ (Telephoto end) | 43.2 | 41.47 | 41.13 |
| Half angle of field $\omega_w$ (Wide angle end) | −39.99 | −41.7 | −41.9 |
| Half angle of field $\omega_t$ (Telephoto end) | −14.35 | −14.77 | −14.89 |
| (1) M3/M2 | 0.46 | 0.29 | 0.52 |
| (2) f4/\|f3\| | 0.77 | 1.08 | 1.12 |
| (3) $\beta_{234w}$ | −0.53 | −0.49 | −0.58 |
| (4) $\beta_{2w}$ | −0.52 | −0.41 | −0.49 |
| (5) $f_w/f_2$ | 0.72 | 0.77 | 0.79 |
| (6) SF111 − SF112 | — | — | 1.75 |
| (7) $R_{12F}/R_{112R}$ | — | — | 0.64 |
| (8) $d_{12}/f_w$ | — | — | 0.021 |
| (9) $(R_{11F} + R_{11R})/(R_{11F} − R_{11R})$ | 1.02 | 0.66 | — |
| (10) $(R_{12F} + R_{12R})/(R_{12F} − R_{12R})$ | −2.99 | −3.14 | — |
| (11) $d_{12}/f_w$ | 0.29 | 0.17 | — |
| (12) $d_{2pn}/f_w$ | 0 | 0.007 | — |
| (13) $(R_{322F} + R_{322R})/(R_{322F} − R_{322R})$ | 1.18 | — | 0.43 |
| (14) $R_{22R}/R_{21F}$ | 0.75 | — | 0.79 |
| (16) $(R_{222F} + R_{222R})/(R_{222F} − R_{222R})$ | — | 3.63 | — |
| (17) $(R_{3F} + R_{3R})/(R_{3F} − R_{3R})$ | 1.22 | 1.22 | 1.18 |
| (18) $(R_{31R} + R_{32F})/(R_{31R} − R_{32F})$ | — | — | — |
| (19) n4 − n31 | −0.00909 | −0.20374 | −0.00909 |
| (20) $f_w/f_4$ | 0.34 | 0.41 | 0.36 |
| (21) $(R_{4F} + R_{4R})/(R_{4F} − R_{4R})$ | 0.68 | 1.38 | 0.74 |
| (22) fb/fw | 1.18 | 1.33 | 1.24 |

Figure 15:
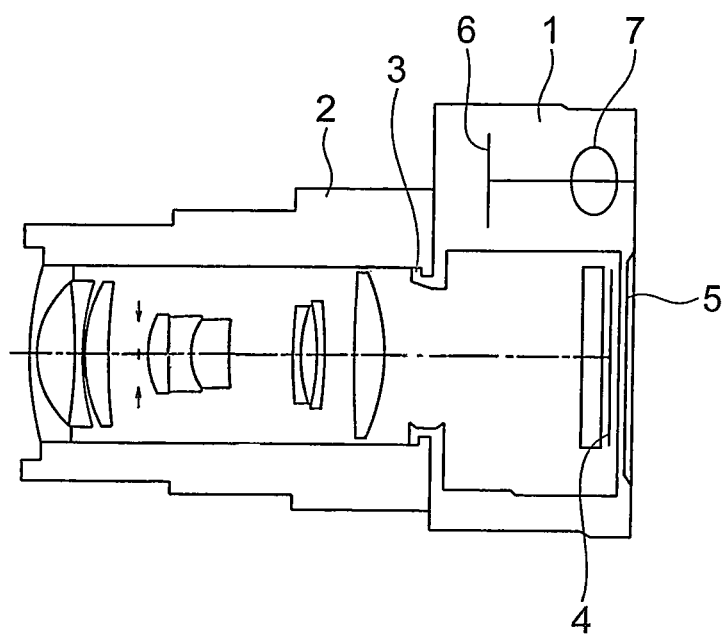
FIG. 15 is a cross sectional view of an interchangeable-lens camera that uses as an interchangeable lens a wide-angle zoom lens according to the present invention.

FIG. 15 is a cross sectional view of an interchangeable-lens camera with a wide-angle zoom lens according to the present invention, which constitutes an electronic image pickup apparatus using as an image pickup element a small-size CCD or CMOS. FIG. 15 shows an interchangeable-lens camera 1, a taking lens system 2 disposed in a lens barrel, a barrel mount portion 3 with which the taking lens system 2 can be detachably mounted on the interchangeable-lens camera 1.

The mount portion may be a screw type mount or a bayonet type mount etc. In the illustrated case, a bayonet type mount is used. FIG. 15 also shows the surface of the image pickup element 4, a rear monitor 5, a viewfinder image display element 6, and a viewfinder optical system 7.

A wide-angle zoom lens according to the present invention like those presented above as the first to seventh embodiments may be used as the taking lens system 2 of the interchangeable-lens camera 1 having the above-described configuration.

According to the present invention, there can be provided as an interchangeable lens suitable for use with an interchangeable-lens digital camera, a compact wide-angle optical system composed of a small number of lenses in which distortion is corrected to some extent, aberrations such as chromatic aberration and curvature of field in particular are corrected excellently, and the telecentricity is achieved.

Figure 16:
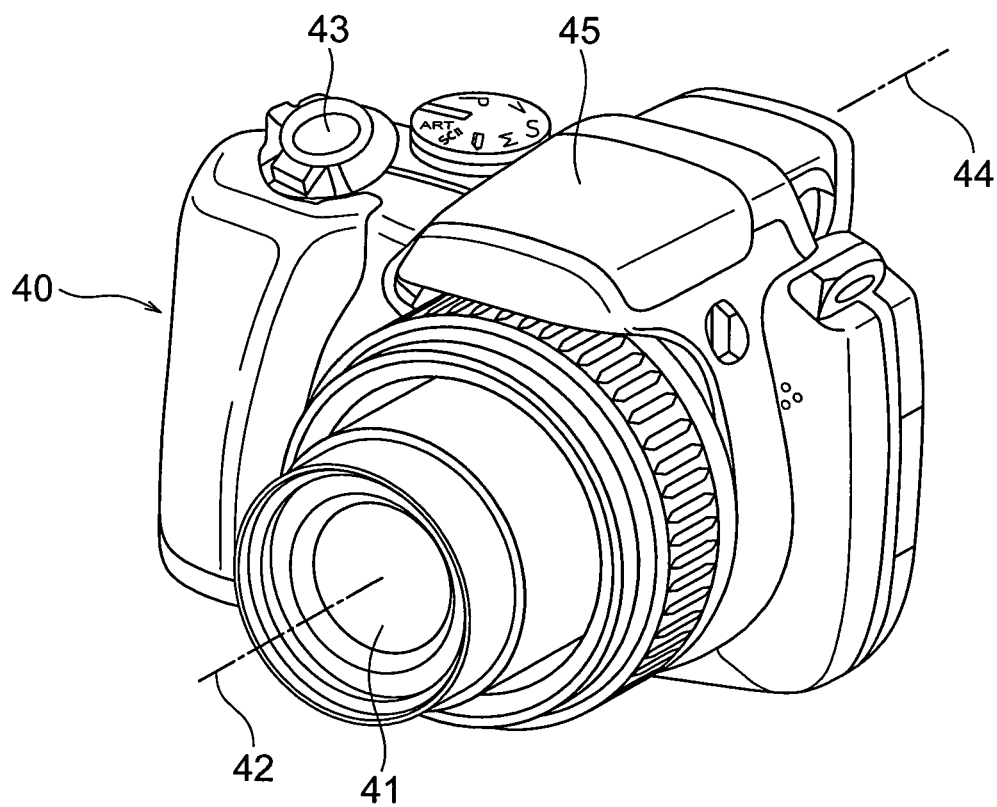
FIG. 16 is a front perspective view showing the outer appearance of a digital camera according to the present invention.
Figure 17:
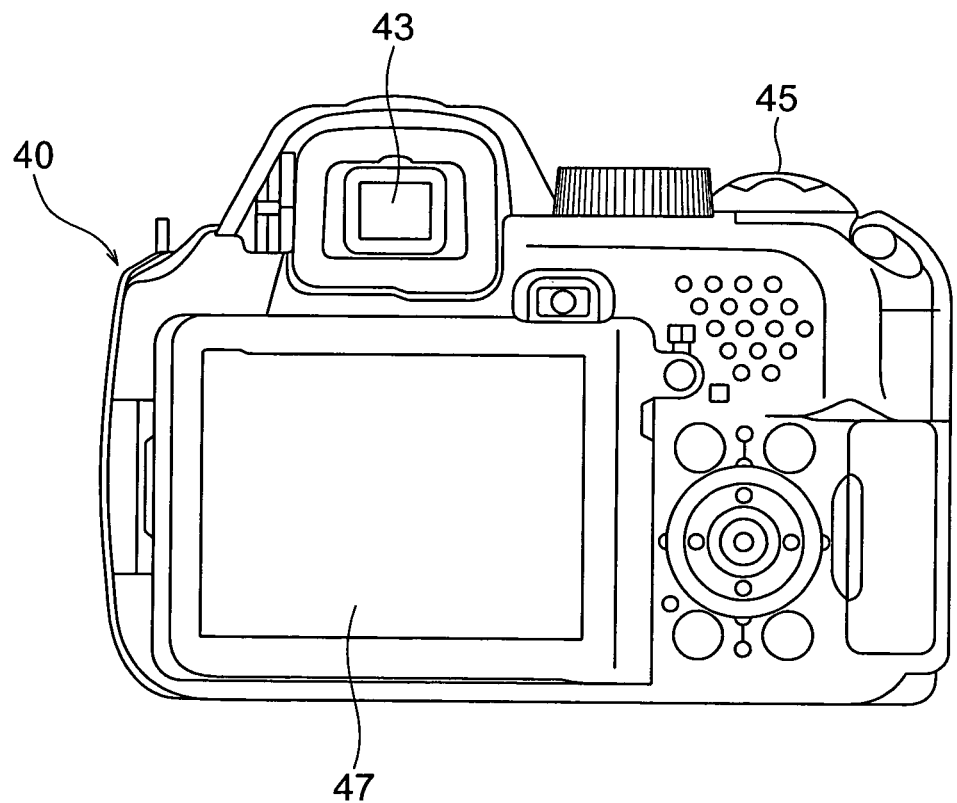
FIG. 17 is a rear view of the digital camera shown in FIG. 16.
Figure 18:
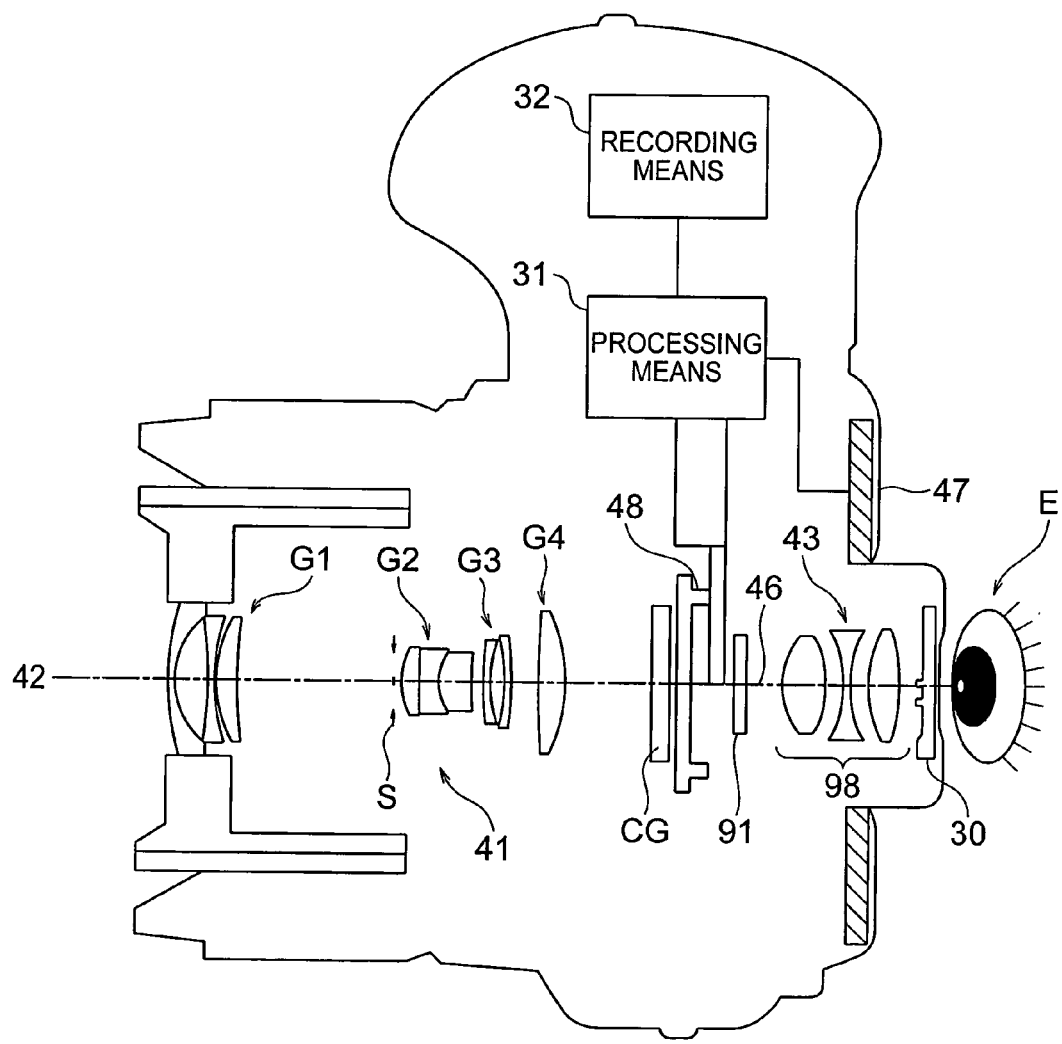
FIG. 18 is the transverse cross sectional view of the digital camera shown in FIG. 16.

FIGS. 16 to 19 show the structure of an image pickup apparatus according to the present invention in which a wide-angle zoom lens is used as the taking optical system 41. FIG. 16 is a front perspective view showing the outer appearance of a digital camera 40. FIG. 17 is a rear view of the digital camera 40. FIG. 18 is a schematic cross sectional view showing the structure of the digital camera 40. While FIG. 16 shows the taking optical system 41 ready for use for shooting (i.e. in an uncollapsed state), FIG. 18 shows the same not in use for shooting (i.e. in the collapsed state).

The digital camera 40 in this illustrative case includes an taking optical system 41 arranged on a taking optical path 42, a viewfinder optical system 43 arranged on a viewfinder optical path 44, a shutter release button 45, a popup flash 46, and a liquid crystal display monitor 47. In response to depression of the shutter release button 45 provided on the top of the camera 40, shooting through the taking optical system 41, e.g. the lens according to the first embodiment, is effected. Specifically, an image of an object is formed on the image pickup surface (or photoelectric conversion surface) of an image pickup element or CCD 49 provided in the vicinity of the image plane by the taking optical system 41 through a cover glass C. The image of the object picked up by the CCD 49 is processed by a processing unit 51 and displayed as an electronic image on the liquid crystal display monitor 47 provided on the back of the camera and/or a viewfinder image display element 54. The processing unit 51 is connected with a storage unit 52, in which picked-up electronic images can be stored.

When not in use after completion of shooting, the entire taking optical system 41 stops at the side of the CCD 49 relative to the focused position of an object at infinity. In order for the taking optical system 41 to be able to shift as a whole along the optical axis to a position closer to the CCD 49 than the position at which the taking optical system 41 is located when it is focused on an object point at infinity, a space between the lens in the taking optical system 41 located closest to the image side and the CCD 49 is provided in advance to leave a regulation region on the CCD 49 side even when the lens barrel is collapsed in its entirety.

The storage unit 52 may be provided separately from the processing unit 51. The storage unit 52 may be an electrically writable medium such as a flexible disk, memory card, or MO. The camera may be a film camera that uses a film in place of the CCD 49.

A viewfinder eyepiece lens 59 is provided on the viewfinder optical path 44. An image of an object displayed on the viewfinder image display element 54 is magnified by the viewfinder eyepiece lens 59 with adjustment of diopter suitable for the observer's eyesight and delivered to the observer's eye E. A cover member 50 is provided on the exit side of the viewfinder eyepiece lens 59.

FIG. 19 is a block diagram of a relevant internal circuit of the digital camera 40. In the case described here, the processing unit 51 described above includes for instance, a CDS/ADC section 24, a temporary storage memory 17, and an image processing section 18, and a storage unit 52 includes a storage medium 19 for example.

As shown in FIG. 19, the digital camera 40 has an operating section 12, a control section 13 connected to the operating section 12. The digital camera 40 also has the temporary storage memory 17, an image pickup drive circuit 16, the image processing section 18, the storage medium 19, a display section 20, and a set-information storage memory section 21, which are connected to control signal output ports of the control section 13 via buses 14 and 15.

The temporary storage memory 17, the image processing section 18, the storage medium section 19, the display section 20, and the set-information storage memory section 21 are configured to be capable of mutually inputting and outputting data via a bus 22. Moreover, the CCD 49 and the CDS/ADC section 24 are connected to the image pickup drive circuit 16.

The operating section 12 is a circuit equipped with various entry buttons and switches. The operating section 12 informs the control section of event information entered from outside (by a user of the camera) through the entry buttons and switches. The control section 13 is, for example, a central processing unit (CPU) and has a built-in program memory, which is not shown in the drawings. The control section 13 is a circuit that controls the entire digital camera 40 according to a program stored in the program memory in response to instructions and commands entered by the user of the camera through the operating section 12.

The CCD 49 receives an image of the object formed by the taking optical system 41 according to the present invention. The CCD 49 is an image pickup element that is driven and controlled by the image pickup drive circuit 16 to convert the quantity of light of the object image into an electrical signal on a pixel-by-pixel basis and output it to the CDS/ADC section 24.

The CDS/ADC section 24 is a circuit that amplifies the electric signal input from the CCD 49, carries out analog-to-digital conversion, and outputs to the temporary storage memory 17 raw image data (or bare data, which will be hereinafter referred to as "RAW data") that has undergone only amplification and digital conversion.

The temporary storage memory 17 serves as a buffer and may consist of an SDRAM for example. The temporary storage memory 17 is a memory device that temporarily stores the RAW data output from the CDS/ADC section 124. The image processing section 18 is a circuit that reads the RAW data stored in the temporary storage memory 17 or the RAW data stored in the storage medium section 19 and performs various electrical image processing including distortion correction based on image-quality parameters specified by the control section 13.

The storage medium section 19 allows a detachable mounting of a recording medium such as a card-type or stick-type flash memory. The storage medium section 19 is a control circuit of the apparatus that records or writes the RAW data transferred from the temporary storage memory 17 and image data having been processed in the image processing section 18 in the card-type or stick-type flash memory to have the data stored in it.

The display section 20 is equipped with the liquid-crystal display monitor 47 and the viewfinder image display element 54 and causes them to display images and operation menu etc.

The set-information storage memory section 21 includes a ROM section in which various image-quality parameters are stored in advance and a RAM section for storing image quality parameters selected by an entry(ies) made through the operating section 12 from among the image quality parameters read from the ROM section. The set-information storage memory section 21 is a circuit that controls the input/output to/from the memories.

According to the present invention, the digital camera 40 as described above can constitute an image pickup apparatus equipped with a compact, wide-angle optical system composed of a small number of lenses in which distortion is corrected to some extent, aberrations such as chromatic aberration and curvature of field in particular are corrected excellently, and the telecentricity is achieved.

The present invention may be applied not only to what is called compact digital cameras for shooting general subjects but also to surveillance cameras or the like that need to have a wide angle of view.

As described in the foregoing, the image forming optical system according to the present invention is useful as a small and slim image forming optical system having an angle of view of approximately 28 to 75 degrees, a back focus approximately equal to its focal length at the wide angle end, and high image forming performance.

The present invention can provide a small and slim image forming optical system having an angle of view of approximately 28 to 75 degrees, a back focus approximately equal to its focal length at the wide angle end, and high image forming performance. The present invention can also provide an electronic image pickup apparatus equipped with such an image forming optical system.

What is claimed is:

1. An image forming optical system comprising, in order from its object side:
   a first lens unit having a negative refracting power;
   a second lens unit having a positive refracting power;
   a third lens unit having a negative refracting power; and
   a fourth lens unit having a positive refracting power, wherein
   the air gaps between the lens units are variable during zooming,
   the first lens unit comprises one positive lens,
   the second lens unit comprises one negative lens,
   the third lens unit consists of one or two lens components,
   the fourth lens unit consists of one lens component, and the following conditional expression is satisfied:

$0 < M3/M2 < 0.55$, where M2 is the amount of movement of the second lens unit during zooming from the wide angle end to the telephoto end in the state in which the zoom lens is focused on an object point at infinity, M3 is the amount of movement of the third lens unit during zooming from the wide angle end to the telephoto end in the state in which the zoom lens is focused on an object point at infinity, and the term "lens component" refers to a single lens or a cemented lens.

2. The image forming optical system according to claim 1, wherein the second lens unit satisfies the following conditional expression:

$-0.8 < \beta_{2w} < -0.407$, where $\beta_{2W}$ is the composite magnification of the second lens unit at the wide angle end in the state in which the zoom lens is focused on an object point at infinity.

3. The image forming optical system according to claim 1 or 2, wherein the fourth lens unit does not move during zooming.

4. The image forming optical system according to claim 1, wherein the following conditional expression concerning the second to fourth lens units is satisfied:

$-0.9 < \beta_{234W} < -0.4$, where $\beta_{234W}$ is the magnification of the composite system made up of the second to fourth lens units at the wide angle end in the state in which the zoom lens is focused on an object point at infinity.

5. An electronic image pickup apparatus comprising:
   an image forming optical system according to claim 1;
   an electronic image pickup element; and
   an image processing unit that processes image data obtained by picking up an image formed through the image forming optical system by the electronic image pickup element and outputs image data having a deformed image shape,
   wherein the image forming optical system satisfies the following conditional expression when it is focused on an object point at infinity:

$0.7 < Y_{07}/(fw \times \tan \omega_{07w}) < 0.97$, where $y_{07}$ is expressed by equation $y_{07} = 0.7 \times y_{10}$, $y_{10}$ being the distance from the center of an effective image pickup area (i.e. an area in which an image can be picked up) of the electronic image pickup element to a point farthest from the center within the effective image pickup area, $\omega_{07w}$ is the angle between the optical axis and the direction toward an object point corresponding to an image point on the image pickup surface at a distance equal to $y_{07}$ from the center of the image pickup surface at the wide angle end in the state in which the zoom lens is focused on an object point at infinity, and fw is the focal length of the entire image forming optical system at the wide angle end in the state in which the zoom lens is focused on an object point at infinity.

* * * * *